US005257639A

United States Patent [19]

Prescott et al.

[11] Patent Number: 5,257,639

[45] Date of Patent: Nov. 2, 1993

[54] ELECTROPNEUMATIC POSITIONER

[75] Inventors: Robert C. Prescott, Marshfield; Donald C. Simpson, Norton; Philip H. Sanford, Walpole; Howard W. Nudd, Foxboro, all of Mass.

[73] Assignee: Dresser Industries, Inc., Dallas, Tex.

[21] Appl. No.: 934,787

[22] Filed: Aug. 24, 1992

Related U.S. Application Data

[60] Division of Ser. No. 712,507, Jun. 10, 1991, Pat. No. 5,159,949, which is a continuation-in-part of Ser. No. 500,524, Mar. 28, 1990, Pat. No. 5,022,425, which is a division of Ser. No. 289,224, Dec. 23, 1988, Pat. No. 4,926,896.

[51] Int. Cl.[5] .......... G05D 7/06; F16K 31/08

[52] U.S. Cl. .......... 137/82; 137/84; 251/65; 251/129.08; 335/229

[58] Field of Search .......... 137/82, 84; 251/129.04, 251/65, 129.08; 335/229

[56] References Cited

U.S. PATENT DOCUMENTS

| | | | |
|---|---|---|---|
| 3,332,045 | 7/1967 | Rodaway | 335/81 |
| 3,441,053 | 4/1969 | Robinson | 137/595 |
| 3,485,256 | 12/1969 | Cho | 137/84 |
| 3,492,760 | 2/1970 | Nishitani | 46/235 |
| 3,772,540 | 11/1973 | Benson | 310/14 |
| 3,794,868 | 2/1974 | Haigh | 310/36 |
| 3,918,016 | 11/1975 | Frankl | 335/224 |
| 4,021,096 | 5/1977 | Dragt | 350/6 |
| 4,085,921 | 4/1978 | Ueda et al. | 251/129 |
| 4,362,182 | 12/1982 | Sjolund | 137/85 |
| 4,492,246 | 1/1985 | Prescott et al. | 137/85 |
| 4,509,403 | 4/1985 | Gassman et al. | 91/365 |
| 4,525,695 | 6/1985 | Sheng et al. | 335/262 |
| 4,527,583 | 7/1985 | Simpson | 137/82 |
| 4,546,338 | 10/1985 | Idogaki et al. | 335/229 |
| 4,554,938 | 11/1985 | Twisselmann | 137/82 |
| 4,574,843 | 3/1986 | Loup et al. | 137/625.65 |
| 4,595,029 | 6/1986 | Roth | 137/82 |
| 4,690,371 | 9/1987 | Bosley et al. | 251/65 |
| 4,938,249 | 7/1990 | Nordeen | 137/82 |

FOREIGN PATENT DOCUMENTS

| | | |
|---|---|---|
| 0230639 | 8/1987 | European Pat. Off. . |
| 0289979 | 11/1988 | European Pat. Off. . |
| 3205576 | 8/1983 | Fed. Rep. of Germany . |
| 2117181 | 10/1983 | United Kingdom . |

OTHER PUBLICATIONS

"Masoneilan Electropneumatic Valve Positioner", *Masoneilan International Inc. Bulletin No.* 313E, 4 pages, copyright 1971.

"Masoneilan Electropneumatic Positioner Instructions", *Masoneilan Instruction No. ES5000E*, pp. 1–16, copyright 1982.

Hicorex ®-Nd H-97 Neodymium-Iron-Boron Permanent Magnets, Hitachi Magnetics Corporation (Nov. 1986).

*Primary Examiner*—Gerald A. Michalsky
*Attorney, Agent, or Firm*—Richards, Medlock & Andrews

[57] ABSTRACT

A transducer having an explosion-proof housing with a divider forming two compartments, and the divider having formed therein a well. A magnet and flapper arm arrangement is suspended within the well. A coil winding is fixed in the other compartment around the well so that a magnetic field generated thereby influences the pivotal position of the magnet. Set screws adjustable in the bottom of the well are effective to preset a rest position of the magnet.

54 Claims, 6 Drawing Sheets

176
174
138
136
172
AIR INLET
170
168
166
164
162
126
164
160
130
128
130a
128a
134
130b
132
128b
154
124
156
152
148
122
150
120
146
145
144
140
142
147
202
204
206
222
210
200
208
218
216
220
224
214
212
228

ELECTROPNEUMATIC POSITIONER

RELATED APPLICATIONS

This application is a division of U.S. patent application Ser. No. 712,507, filed on Jun. 10, 1991, now U.S. Pat. No. 5,159,949, which is a continuation-in-part of U.S. patent application Ser. No. 500,524, filed Mar. 28, 1990, now U.S. Pat. No. 5,022,425, which is a division of U.S. patent application Ser. No. 289,224, filed Dec. 23, 1988, now U.S. Pat. No. 4,926,896.

TECHNICAL FIELD OF THE INVENTION

The present invention relates in general to transducers, and more particularly to the type of transducers which convert electrical input signals to either mechanical or pressure outputs.

BACKGROUND OF THE INVENTION

Transducers are employed in a variety of applications for converting one form of energy into another. The forms of energy which often require conversion include electrical, mechanical, pressure, light, heat, sound, etc. It can be appreciated that transducers are necessary in most machines or equipment as it seldom happens that a machine does not operate between two or more forms of energy.

The development and manufacture of transducers have become highly competitive fields. There is a constant effort to provide transducers which are more reliable, accurate, less costly, easily manufacturable and more compact. Current to pressure transducers are among a class of transducers which requires a high degree of accuracy and reliability, while yet remaining cost effective. U.S. Pat. Nos. 3,441,053; 4,492,246; and 4,527,583 disclose sophisticated transducers, generally adapted for converting electrical input energy through an intermediate mechanical medium to control an output gas pressure. The first of the noted patents is mechanically complicated, while the two latter-identified patents are highly sophisticated and require a large number of electrical components. As is usually typical, an improvement in the reliability or accuracy of a transducer is generally accompanied by an increase in the complexity of the equipment.

Many transducers, and especially the electrical to pressure type of transducers which are utilized in hydrocarbon refineries, are required to be explosion-proof. Special precautions including highly sophisticated and costly enclosures have been adapted to render such transducers mechanically sound and sturdy to contain an internal explosion, if one should occur, and prevent the resulting fire or flame from spreading to the environment. Special attention is also given to circuit elements which can store electrical energy, such as inductors and capacitors, to reduce or eliminate the likelihood of such elements generating sparks. The explosion-proofing by encasement of a transducer of the type having a moving coil winding can be extremely difficult. Typically, it is expedient to mount the coil movable with respect to a permanent magnet, as magnets are generally much heavier and more bulky than the associated coils. In such a transducer, the electrical input is applied to the moving coil which then moves under the influence of the fixed permanent magnet. By virtue of its requirement to move in correspondence with the amount of current applied to the coil, it is extremely difficult to encase such a coil and render the entire transducer explosion-proof.

From the foregoing, it can be seen that a need exists for an improved electrical to mechanical transducer which is reliable, cost effective, accurate and easily manufacturable. An associated need exists for an explosion-proof transducer of the type having a lightweight permanent magnet and a coil winding combination, but with the winding fixed to a frame structure to thereby make explosion-proofing of the transducer much easier. Another need exists for an improved current to pressure transducer having a lightweight movable magnet with a high degree of permanent magnetization such that a smaller magnet can be employed, thereby also reducing the size and complexity of the transducer. A further need exists for a transducer which has a high mechanical resonant frequency compared to its operational environment. A related need is the provision of a transducer having parts that are low cost, easily moldable, lightweight and corrosion resistant. Yet another need exists for a transducer structure which is of reduced complexity, which has few moving parts, a fast response time and which is yet accurate and reliable.

SUMMARY OF THE INVENTION

In accordance with the invention, there is disclosed an improved transducer that substantially reduces or eliminates the shortcomings and disadvantages of prior, well-known transducers. According to the invention, a permanent magnet constructed of a material having an extremely high degree of magnetization is mounted for small pivotal movements when influenced by magnetic fields of a coil winding. The coil winding is, in turn, fixed to a frame structure of the transducer so that it can be easily encased with an enclosure to explosion-proof the transducer unit. In response to varying amplitudes of a current by which the coil winding is driven, the permanent magnet pivots accordingly. A plastic saddle structure, which also includes an extension defining a flapper arm, is mounted to the permanent magnet so that when the magnet pivots, a corresponding mechanical output is produced by the flapper arm. The saddle structure and magnet are surrounded by the coil winding and allowed to pivot by the use of flexure strips. A nozzle assembly is mounted to the frame or housing of the transducer and cooperates with the flapper arm. The mechanical output can be utilized in conjunction with a nozzle to control pressure and thereby function as a current to pressure transducer. Moreover, a spring can be fastened between the flapper arm and a pressure actuated valve stem to provide system feedback in a pneumatic positioner.

In the preferred embodiment of the invention, the permanent magnet is constructed of neodymium-iron-boron composition and provides an extremely high magnetic energy. In addition, the magnet is cross-field polarized in a direction transverse to an axis of magnet movement. The magnet is mounted within the coil winding so that the horizontal pivotal axis of the magnet is transverse to a vertical axis about which the coil winding is centered, whereupon the magnet pivots in correspondence with the electrical energization of the coil winding.

The transducer of the invention is rendered less susceptible to vibration by constructing the magnet as a small disk, and with the saddle structure and flapper arm of moldable plastic to reduce the weight of the moving parts, thereby increasing the mechanical resonant frequency. With this construction, the transducer is less susceptible to errors caused by pumps and vibrating equipment to which the transducer may be mounted.

According to another aspect of the invention, a novel nozzle-flapper arrangement is provided to improve the linearity between the nozzle pressure and the corresponding force applied to the flapper arm. The nozzle has an annular opening defined by a sharp annular edge that is tapered rearwardly. The flapper arm has a round button with a flat surface against which the air from the nozzle orifice coacts. The diameter of the button is larger than the diameter of the orifice of the nozzle.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
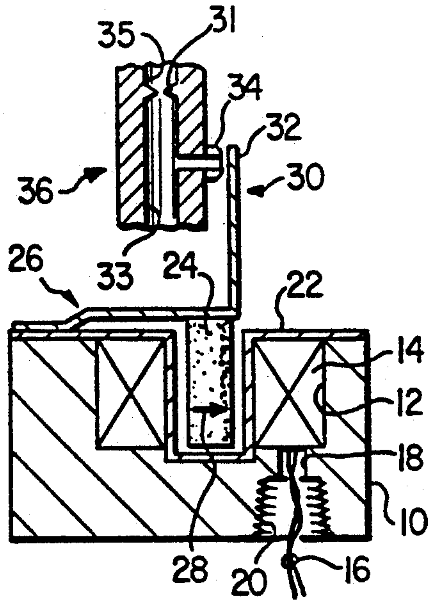
FIG. 1 is a generalized sectional view of an exemplary current to pressure transducer for illustrating the principles and concepts of the invention.

FIG. 1 comprises transducer structure for illustrating the principles and concepts of the invention. The major components of the transducer include a case 10 for providing a frame structure for mounting thereto the other components of the transducer. The case 10 of this embodiment is preferably constructed of a soft steel to provide a magnetic field return path. The case 10 is constructed with a cylindrical bore 12 for holding therein a reel-shaped coil winding 14. The ends of the electrical conductor forming the coil winding 14 are routed through an internal conduit 18 formed within the case 10. An internally threaded opening 20 is formed in communication with the conduit 18 for providing access to the ends 16 of the coil winding conductor. An enclosure 22 can be easily and economically fixed to the case 10 for encasing the coil winding 14 and rendering it inaccessible to puncture or other damage, thereby containing any ignition and making the transducer explosion-proof.

A permanent magnet 24 with an extremely high magnetic intensity is mounted by means of arm 30 with respect to the case 10 so as to be pivotally movable about a flexible portion of arm 30 defining an axis 26. Moreover, the permanent magnet 24 is magnetized in the direction of a vector arrow 28 to define a cross-field polarized permanent magnet. When magnetized in the direction noted, a current applied to the coil winding 14 produces a magnetic field which influences the permanent magnet 24 so that it exhibits a tendency to rotate or pivot. Preferably, the magnet 24 is mounted very close to the coil winding, and thus it pivots much less than 10°, and even less than 1°. Depending upon the polarity of the current applied to the coil winding 14, the permanent magnet 24 will tend to rotate either clockwise or counterclockwise.

An arm 30 providing a mechanical output of the transducer is fixed with respect to the case 10, and particularly is shown fixed to the coil bobbin enclosure 22. The arm 30 is constructed of a material which can be flexed for the reasons specified below. The arm 30 is adhered, cemented, or otherwise fixed to the permanent magnet 24 so as to be movable about axis 26 in response to the movement of the magnet 24. In the preferred embodiment of the invention, the arm 30 includes an extension 32 which cooperates with a nozzle 34 to cause a change in a gas pressure in correspondence with a change in the magnitude of the current through the coil winding 14. The nozzle 34 is of conventional design, for cooperating with the arm extension 32 to cause a change in the pressure of the gas within the pressurized line 36. As is conventional, when the arm extension or flapper 32 moves closer to the orifice in the nozzle 34, the pressure at outlet 33 is increased, due to accumulation of the flow of gas from supply end 35 through restriction 31. Conversely, as the flapper 32 moves away from the orifice of the nozzle 34, the gas pressure at the outlet end 33 decreases. Hence, a change in the pressure within the gas line 36 can be achieved. The air pressure carried by line 36 can be utilized to control a process control valve, or other equipment, in response to a control current coupled to the transducer.

The conversion of the electrical current to a specified gas pressure in the line 36 is carried out by driving the coil winding 14 with a predetermined DC current. A magnetic field of an associated magnitude will be generated by each winding of the coil 14, thereby influencing and imposing a torque to the permanent magnet 24. The permanent magnet 24, being magnetized according to the vector arrow 28, will rotate either clockwise or counterclockwise about axis 26, depending upon the polarity of the current. When rotated or pivoted, the permanent magnet 24, being attached to the arm 30, causes a corresponding movement of the arm extension 32. If current is driven into the coil winding 14 in one direction, the arm extension 32 will move closer to the orifice of the nozzle 34, thereby closing off the orifice and increasing the pressure within the pressurized gas line 36. On the other hand, by driving a current the other direction in the coil winding 14, the arm extension 32 will be moved in an opposite direction, whereupon the orifice within the nozzle 34 will be opened and the gas pressure within the line 36 will be decreased.

In accordance with an important feature of the invention, the permanent magnet 24 is constructed of a material composition comprising neodymium-iron-boron. The permanent magnet of such a composition is obtainable from Hitachi Magnetics Corporation, Edmore, Michigan, under trademark HICOREX-Nd. Such magnets are obtainable with extremely high magnetic energies of about 30,000,000 gauss-oersted. The magnets are available at reasonable costs and are not affected by physical impact or shock, as are most Alnico-type magnets. Importantly, the weight of such type of permanent magnets is less than that of coil windings formed of copper conductors, and thus it becomes advantageous to mount the lightweight permanent magnet 2 for movement, rather than the coil winding 14. The neodymium-iron-boron constructed magnet weighs about 7.5 gram/cc, thus making it compact and having a characteristic low inertia. As can be appreciated, the moment of inertia of a solid magnet is smaller than that of a moving coil, and thus the magnet 24 is more responsive to fast changes in the magnetic field of the coil winding 14. The coil winding 14 can be wound with a desired number of windings of a small wire gauge to establish a selected magnetic field and coil resistance combination. When utilizing such a current to pressure transducer with hydrocarbon refinery apparatus, the coil winding 14 should have a resistance no greater than about 200 ohm. The standards established in the refinery environment specify that control currents should be within 4–20 milliamp. With a solid copper wire gauge of 38, the coil can be wound with a significant number of turns to achieve a magnetic field sufficient to cause rotation of the permanent magnet 24.

Figure 2:
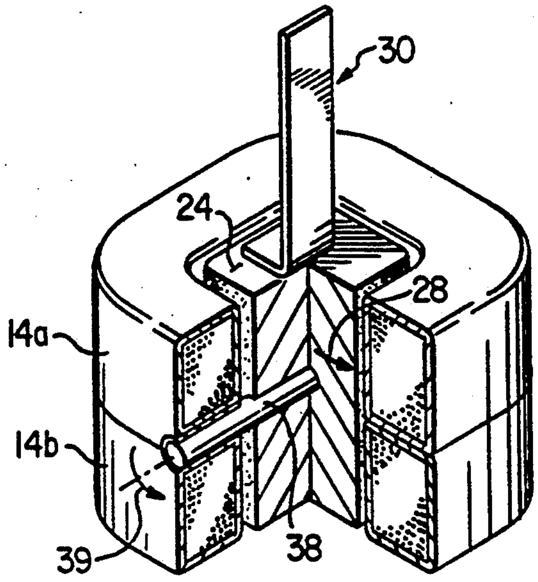
FIG. 2 depicts another transducer embodying the principles and concepts of the invention.

FIG. 2 shows another embodiment of a transducer which is pivotally mounted about an axis extending through the center of gravity of the magnet. Similar elements are numbered in correspondence with the transducer shown in FIG. 1. The permanent magnet 24 has an axle rod 38 fixed to or extending therethrough for rotation about a horizontal axis. The axis of magnet rotation is orthogonal to magnetization of the permanent magnet 24, as shown by vector arrow 28. The coil winding 14 is constructed in two parts 14*a* and 14*b*, for accommodating the axle rod 38. The coil windings 14*a* and 14*b* are shown generally rectangular in shape, as they would appear after having been wound around a rectangular bobbin. Other coil winding shapes may be better suited for other applications or purposes. When a DC current is applied to the coil windings 14*a* and 14*b*, a torque is imposed on the permanent magnet 24, causing pivotal movement about the axle rod 38, as shown by arrow 39. As the permanent magnet 24 rotates, the flapper arm 30, which is attached thereto, also rotates. The movement of the flapper arm 30 cause a corresponding change in the pressure of a gas line in the manner noted above with the transducer of FIG. 1.

Figure 3:
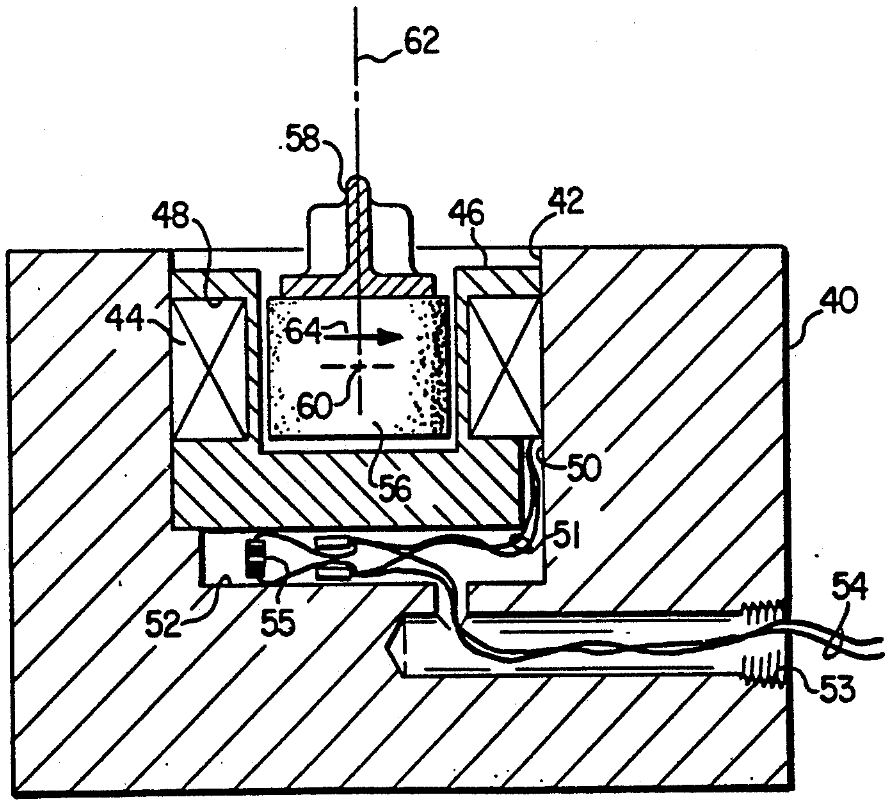
FIG. 3 is a cross-sectional view of the current to mechanical transducer of the invention, illustrating the pivotal permanent magnet mounted to a yoke.

With reference now to FIG. 3, there is illustrated a portion of the electrical to mechanical transducer constructed according to one embodiment of the invention. Depicted is a transducer body 40 constructed of a 1018 type cold rolled steel, having a bore or cavity 42 for holding a coil winding 44. The steel body 40 functions as a return path for the magnetic flux field generated by the coil winding 44 and for the flux field of magnet 56. The coil winding 44 is wound around a heavy bobbin 46 constructed of a conductive, but non-magnetic material, such as copper. As used herein, the term non-magnetic connotes a material having a low permeability to magnet flux. The winding bobbin 46 is cylindrical in form, including an outer annular channel 48 in which the conductor of the coil winding 44 is wound. The bobbin 46 includes a channel 50 for routing therethrough the pigtail ends 51 of the coil winding conductor. The transducer body 40 further includes a chamber 52 which is formed in communication with an internally threaded bore 53 which provides external access to the coil winding conductor ends 51. The chamber 52 provides sufficient room within the explosion-proof transducer body 40 for connecting or splicing thereto heavier gauge wires 54 so that the transducer can be remotely controlled. The chamber 52 can accommodate twist-on splice connectors, or other components, such as diodes 55 for reducing transient voltages across the coil winding 44.

In constructing the transducer of the invention, the bobbin 46 is wound with a small wire gauge to a predetermined number of windings. The bobbin 46 is preferably wound with about 1100 turns of a solid 38 gauge copper wire. The number of turns and wire gauge can be varied to provide other magnetic field intensities for influencing the permanent magnet 56. The pigtail conductor ends 51 are then nested within the channel 50 and all other necessary connections are made thereto and the bobbin unit is then press fit within the bore 42 of the transducer body 40. The heavier gauge wires 54 are, of course, routed through the internally threaded bore 53 of the body 40 to provide external access thereto. The outer diametric dimension of the bobbin 46 is constructed such that it is press fittable within the bore 42 of the transducer case 40. With such an arrangement, the coil winding 44 is entirely enclosed and thus not susceptible to puncture from external objects. Any internal explosion occasioned by sparking of the coil winding conductors is contained within the transducer. The noted construction is thereby considered explosion-proof insofar as an explosion caused by the ignition of gases within the chamber 52, caused by the arcing of the coil winding, is contained, which otherwise could cause the ignition of explosive gases in the environment around the transducer. A weld can be made along an internal annular edge where the outer edge of the bobbin 46 joins the internal bore 42 of the transducer case 40. A gas tight connection of the metals can be sealed between the winding bobbin 46 and the transducer body 40 by electron beam or laser beam welding. Of course, externally threaded pipe connections can be made to the threaded bore 53 of the body 40 to provide a gas tight conduit for routing the conductors 54 to remote electrical apparatus for controlling the magnitude of the current in the coil winding 44. It can be appreciated that by constructing the transducer of the invention with a movable permanent magnet and a fixed coil winding, the current carrying component can be more easily encased within a gas tight enclosure to render the unit explosion-proof.

Fixed to the top of the high magnetic energy permanent magnet 56 is a lateral portion 58 of a non-magnetic yoke for pivoting the magnet 56 about a horizontal axis 60. The axis 60 is generally centered symmetrically with respect to the center of gravity of the permanent magnet 56. The lateral portion 58 of the yoke is reinforced sufficiently to prevent twisting of the yoke when the permanent magnet 56 is caused to be rotated. The torsional movement of the permanent magnet 56 is thereby transmitted without loss to all parts of the yoke. The lateral part 58 of the yoke is preferably adhered to the top part of the magnet 56 by a cement or other suitable adherent. Span adjustments to the transducer can be made by structure to be described in detail below.

The permanent magnet is rod-shaped and suspended by the lateral part 58 of the yoke in axial alignment with a vertical axis 62 about which the coil winding 44 is centered. As noted above, other coil or magnet shapes, such as rectangular or square, can be employed with equal effectiveness. The diameter of the permanent magnet 56 is 0.62 inch, with a height of about 0.28 inch. The annular spacing between the permanent magnet 56 and the coil winding bobbin 46 is about 1/64th inch. While the noted spacing is small, there is sufficient room for the permanent magnet 56 to pivot sufficiently about lateral axis 60. To be described in more detail below, the slight pivotal movement of the permanent magnet 56, and thus that of the lateral part of the yoke, is accentuated by a lever arm which functions as a flapper. The permanent magnet 56 is obtainable from Hitachi Magnetics in a cross polarized manner, such as noted by vector arrow 64. As noted above, a current induced in the coil winding 44 produces a magnetic field which is effective to coact with the magnetic field of the permanent magnet 56 and thereby rotate the magnet about horizontal axis 60. The permanent magnet 56 can generate a torque of about 0.015 inch-lb. Moreover, the torque produced by the magnet 56 is linearly proportional to the current in the coil winding 44.

Also as noted above, the coil winding bobbin 46 is constructed of a non-magnetic material, such as brass or copper. Preferably, the bobbin 46 is constructed of thick copper to provide a highly conductive material. In accordance with an important feature of the invention, the conductive, but non-magnetic bobbin 46 renders the transducer less susceptible to control modulation error due to vibration. It can be appreciated that any vibratory movement of the magnet 56 occasioned by movements of the transducer itself is translated into corresponding movement of the associated arm. This produces an undesired modulation of the transducer output. Any vibration which has a tendency to move the permanent magnet 56 with respect to the coil winding bobbin 46 also induces eddy currents within the bobbin 46. The small eddy currents induced within the bobbin 46 by the movement of the magnet 56 generate a countermagnetomotive force magnetic field which, in turn, counteracts the magnetic field of the magnet, thus offsetting the movement of the magnet 56. These induced eddy currents thereby provide automatic resistance to the vibratory movement of the permanent magnet. Hence, automatic dampening of the permanent magnet 56 is provided to reduce the effects of vibration to which the transducer may be subjected, all without additional, complicated or exotic circuits or equipment. The bobbin 46 essentially functions as one or more shorted turns. As such, equivalent structures can be formed by winding a nonconductive bobbin with one or more shorted turns of a conductor.

The coil winding bobbin 46 is preferably constructed of an OFHC copper having an internal diameter of about 0.67 inch The outer diameter of the bobbin 46 is about 1.36 inches, press fittable within the bore 42 of the transducer body 40. The outer annular bobbin channel around which the conductor of the coil winding 44 is wound includes a cross-sectional dimension of about 0.28 inch by about 0.37 inch.

Figure 4:
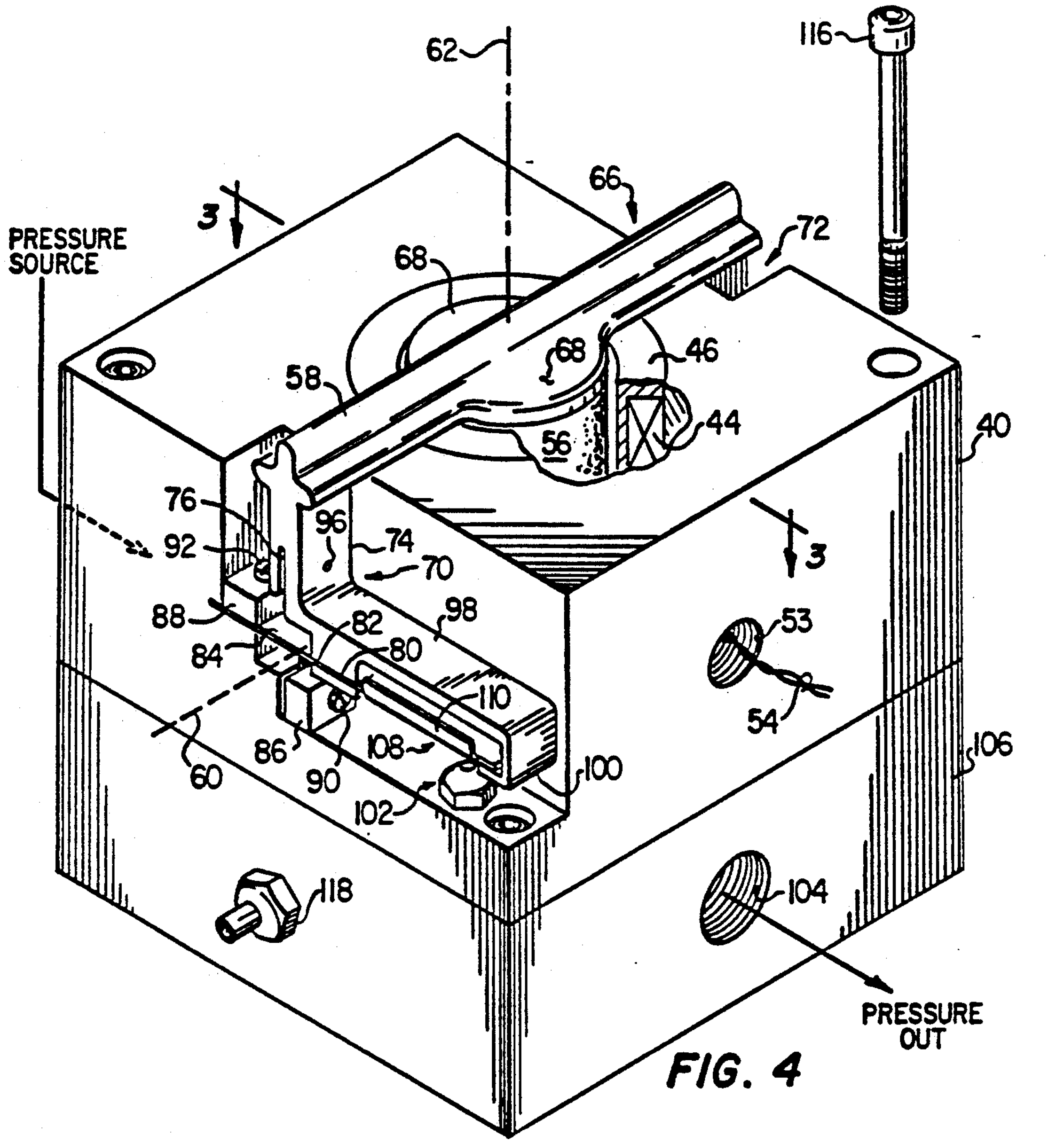
FIG. 4 is an isometric view of the current to mechanical transducer according to the preferred embodiment of the invention, connected in association to pressure apparatus for converting the mechanical output to control a gas pressure.
Figure 5:
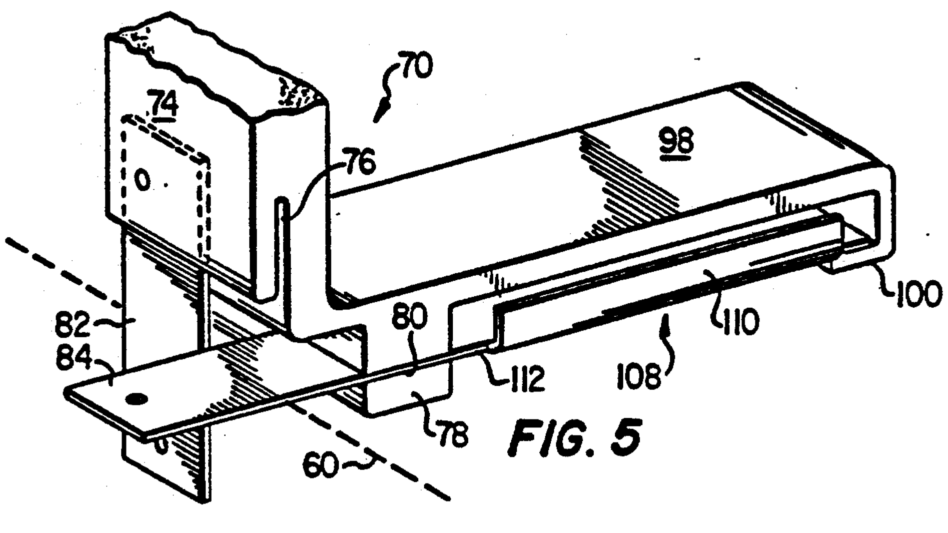
FIG. 5 is an enlarged view of the flexure strips of FIG. 3 utilized to provide a frictionless bearing to the yoke.

With reference now to FIGS. 4 and 5, there is shown in more detail the yoke structure 66 for pivotally suspending the permanent magnet 56 within the coil winding 44. As noted, the yoke 66 includes a lateral part 58 for attachment to the permanent magnet 56. Also, the lateral part 58 is provided with opposing side extensions 68 for providing a larger surface area for adhering to the top of the permanent magnet 56. Formed integral with the lateral part 58 of the yoke 66 are downwardly depending supports 70 and 72. Both downwardly depending supports 70 and 72 and associated bearings are constructed in substantially identical manners.

A vertical part 74 of support 70 includes a vertical slot 76, while a horizontal part 78 of support 70 includes a horizontal slot 80. Slots 76 and 80 are adapted for receiving therein corresponding ends of flexure strips 82 and 84. The other ends of the flexure strips 82 and 84 are anchored to the transducer body 40 by fastening blocks 86 and 88. The fastening blocks 86 and 88 function to secure the ends of the flexure strips 82 and 84 to the transducer body 40 by corresponding screws 90 and 92 extending through the blocks, through holes in the flexure strips 82 and 84 and are threadably secured within the body 40. When fixed in the manner noted, the flexures 82 and 84 define a frictionless bearing for allowing a rotation only about a horizontal axis 60. The flexure strip bearings provide almost no lateral movement, thereby maintaining the permanent magnet 56 accurately and precisely suspended about its center of gravity within a close tolerance within the coil winding bobbin 46.

Because of the close proximity of the magnet 56 to the coil winding bobbin 46, i.e., 1/64th inch, the magnet 56 must be accurately placed and pivoted within the bobbin 46. Spacings greater than 1/64th inch are possible, but at the expense of reduced magnetic coupling between the permanent magnet 56 and the winding bobbin 46. The yoke 66 and the permanent magnet 56 are prevented from moving radially in any direction about horizontal axis 60 as well as axially along vertical axis 62. The permanent magnet 56 is thereby constrained for precise pivotal movement within the coil winding 44. The terms vertical and horizontal are used herein only for easy reference and understanding of the drawings, and are not to be construed as limitations of the invention. Of course, the transducer of the invention can be mounted for operation in any spatial orientation.

The ends of the flexure strips 82 and 84 are cemented within the corresponding slots 76 and 80 of the downwardly depending support 70. Holes, such as 96, are provided in the support so that the adherent or cement can enter such holes and provide an improved securement of the flexure strip ends therein.

The flexure strips 82 and 84 are preferably constructed of beryllium copper to provide the desired flexibility so that the yoke 66 is rotatable about the horizontal axis 60. In addition, the slots 76 and 80 are formed in the downwardly depending support 70 at such a location such that the axis 60 formed by the crossing of the flexure strips coincides with the axial center of the permanent magnet shown in FIG. 2. The magnetic influence generated by the energized coil winding 44 thus pivots the permanent magnet 56 about the horizontal yoke axis 60, and thus also about the lateral center of gravity axis of the permanent magnet. As noted above, the other downwardly depending support 72 of the yoke 66 is pivotally anchored on the other side of the transducer body 40 by similar flexure strip structures.

A lateral rigid arm 98 is formed at the lower end of the downwardly depending support 70 for providing a mechanical output of the transducer. The end of the rigid arm 98 is constructed with an inwardly bent section 100 for engaging an undersurface of the end of a planar spring arm 108. The spring arm 108 is spaced from the nozzle orifice a predetermined distance when the yoke 66 and associated permanent magnet 56 are at a quiescent or rest position. While not shown, the orifice of the nozzle 102 is in fluid communication with the gas stream in bore 104, via connecting channels in the transducer body 40 and attached block 106. The spring arm 108 is biased against the rigid arm 98. The spring arm 108 is constructed of the same material as the flexure strips 82 and 84, and is fixed to the support part 78 by a cement or other adherent, or by suitable fastening hardware. The spring arm 108 includes an angled section 110 formed along its length to provide rigidity thereto so that the spring arm 108 resists bending when subjected to a pressurized stream of gas exiting an orifice in the top of the nozzle 102. A short section 112 of the spring arm 108 is not so reinforced, and thus provides a certain degree of flexibility when the spring arm 108 is forced in abutment with the nozzle 102.

The bottom surface of the transducer body 40 and the top surface of the block 106 are machined to a gas tight finish and bolted together at the corners by screws such as shown by reference character 116. The block 106 is of conventional design having a bore 104 extending therethrough and internally threaded at each end for connection to other connecting pipes. A constant gas pressure source is connected to an inlet side of the bore 104, while the adjusted or controlled gas pressure is obtained from an output side of the block. As described, the orifice of the nozzle 102 is internally connected to such bore 104. Also provided is a restrictor 118 effective to restrict the inlet gas supply.

FIG. 5 illustrates in further detail the lower part of the downwardly depending support 70 of the yoke 66. As can be seen, the vertical slot 76 receives the vertical flexure strip 82, while the horizontal slot 80 receives the horizontal flexure strip 84. When the ends of the flexure strips 82 and 84 are secured to the downwardly depending support 70 in the manner noted, the yoke 66 is supported and constrained for rotation about axis 60. The rotation of the yoke 66 about horizontal axis 60 causes the corresponding movement of the spring arm 108, thereby providing the mechanical output of the transducer. The amount of mechanical movement desired from the transducer, based upon the degree of pivotal movement of the permanent magnet 56, can be set according to the length of the spring arm 108. For a specified angular rotation of the permanent magnet 56, and thus the yoke 66, a wider range of mechanical movement can be obtained by a longer spring arm 108, and vice versa. Also, the spring arm 108 need not be constructed as shown, but can be a diaphragm or other surface which coacts with the nozzle orifice to control the pressure released from the nozzle.

As noted above, the spacing between the permanent magnet 56 and the coil winding bobbin 46 is very small, 1/64th inch, to provide a tight coupling of the magnetic influence between the permanent magnet 56 and the coil winding 44. With such a small spacing, the degree of pivotal movement of the magnet is extremely small, but is multiplied by the length of the spring arm 108. In the preferred embodiment, the distance between the horizontal axis 60 and the orifice of the nozzle 104 is about 0.78 inch. By energizing the coil winding with an electrical current between 4 and 20 milliamp, the spring arm 108 can be caused to move in the range of 0.001-0.003 inch to provide a corresponding pressure change of the gas within the bore 104, between 3-15 psig. As can be appreciated, the spring arm 108 moves very little to produce a substantial change in the gas pressure in the bore 104. It is to be noted that the foregoing results are obtained using a nozzle 102 having an orifice diameter of about 0.040 inch.

While the various parameters of the transducer of the invention have been selected to provide gas pressure control of the type normally utilized in hydrocarbon refinery environments, such parameters and apparatus can be modified such that the transducer can be employed in many other applications. For example, the current supplied to the coil winding 44 can be increased to increase the torque generated by the permanent magnet 56, it being realized that the torque is linearly proportional to the current. The type of material selected for use in the flexure strips 82 and 84 can also be selected to provide a certain degree of resistance to the pivotal movement of the permanent magnet 56. As noted also, the length of the spring arm 108 can be varied or adjusted to achieve a desired range of mechanical movement output from the transducer. Importantly, the permanent magnet 56 can be selected with a desired magnetic intensity so that the force or torque of the pivotal movement thereof is sufficient, based upon the winding turns and current carrying characteristics of the coil winding 44. With the coil winding 44 being fixed, it can be wound with heavy gauge wire, on a thick bobbin, to provide high degree of dampening to the transducer. Preferably, the magnetic intensity of the permanent magnet 56 is maximum, thereby requiring a smaller magnetic field generated by the coil winding 44. In the preferred embodiment, a lightweight neodymium-iron-boron composition permanent magnet is capable of providing an extremely high magnetic intensity, while yet maintaining the magnet at a size suitable for use in transducer applications. By employing slight pivotal movement of a magnet, the moment of inertia is maintained small, thereby providing a transducer responsive to quickly changing coil currents. While the transducer shown in FIG. 4 depicts the major components for illustrating the principles and concepts of the invention, other components will generally be required to provide adequate calibration, linearity, zeroing and maintenance of the operational characteristics of the transducer.

The transducer shown in FIG. 4 can be easily adapted for providing dual control of pressures by a single current input. For example, the downwardly depending support 72 can also be fitted with an arm and spring member structure similar to that attached to opposing support 70, and adapted for operating in conjunction with another nozzle. Such other arm structure can be oriented in a direction opposite to that of rigid arm 98, for providing an inverse control over another gas pressure. In other words, the transducer 106 can be modified to provide another bore and associated nozzle, the pressure of which is controlled by the movement of an arm connected to the downwardly depending support 72. With such an arrangement, when a current is applied to the coil winding 44, via conductors 54, the yoke 66 will rotate in an associated direction, thereby moving the arm structures in opposing directions with respect to their respective nozzles. One arm will move closer to its associated nozzle, while the other arm will move away from its nozzle, thereby providing the inverse control of the respective gas pressures. As an alternative, the dual arms of the transducer can be oriented in the same direction to provide a common control of gas pressures in a pair of bores within the block 106, both increasing or decreasing the respective gas pressures by the pivotal movement of the permanent magnet 56 and yoke 66. Yet other options are available with the noted transducer construction. For example, the transducer can be assembled using identical parts, but outfitted with an arm either on yoke support 70 or 72 to provide transducers with opposite adjustment or control characteristics. With such a versatile construction, the same parts can be used to provide a transducer which increases an output gas pressure with increasing coil winding current, or one which decreases an output gas pressure, also with an increasing coil winding current.

An electrical to mechanical transducer, such as that constructed in accordance with the invention, does not require external feedback provisions for maintaining a desired gas pressure output based upon a predefined input current. Also, because the torque of the permanent magnet 56, and thus that of the spring arm 108 is proportional to the current in the coil winding 44, the movement of the spring arm 108 linearly follows changes in the coil winding current. Also, the force exerted by the nozzle gas on the spring member 108 is proportional to the product of the gas pressure and nozzle orifice area. In a state of operational equilibrium, the torque of the spring arm 108 is in balance with the force exerted thereon by the gas escaping from the nozzle orifice. Any error or imbalance causes the nozzle to open or close, thereby changing the force until it is again in balance with the torque of the spring arm 108. By appropriately calibrating the spacing of the spring arm 108 with respect to the orifice of the nozzle 102 when the permanent magnet 56 is at a rest position, desired gas pressures in the bore 104 can be obtained by driving the coil winding 44 with predetermined DC levels of current.

As noted above, a self-feedback of the transducer is provided without requiring additional circuits or hardware, and serves to improve the linearity of the transducer. Thus, as the current supplied to the coil winding 44 increases to increase the torque, the spring arm 108 moves clockwise in FIG. 4, until there is an equilibrium with the upward gas pressure force which resists downward spring arm movement. As a result, the spring arm 108 moves closer to the orifice of the nozzle 102. Gas pressure escaping from the orifice of the nozzle 102 becomes restricted, thereby increasing the gas pressure in the bore 104. By this action, the gas pressure exiting the orifice of the nozzle 102 also increases, thereby providing additional force in resistance to the further downward movement of the spring arm 108. A quiescent state is reached in which the force of the pressure of the nozzle orifice counterbalances the rotational torque of the spring arm 108 imposed on it by the permanent magnet 56. As can be appreciated, the cooperation between the self-feedback and the movable permanent magnet of the transducer provides sufficient feedback to provide a stable transducer, all without additional circuits or equipment.

While the self-feedback may be sufficient for small pressure applications, other external apparatus may be required to match a small-size pressure transducer to large size pressure lines and the like. For example, various bellows, pistons and diaphragms well known in the art may be utilized as external coupling equipment as gain producing apparatus adapting large nozzle pressures to the transducer of the invention.

Figure 6:
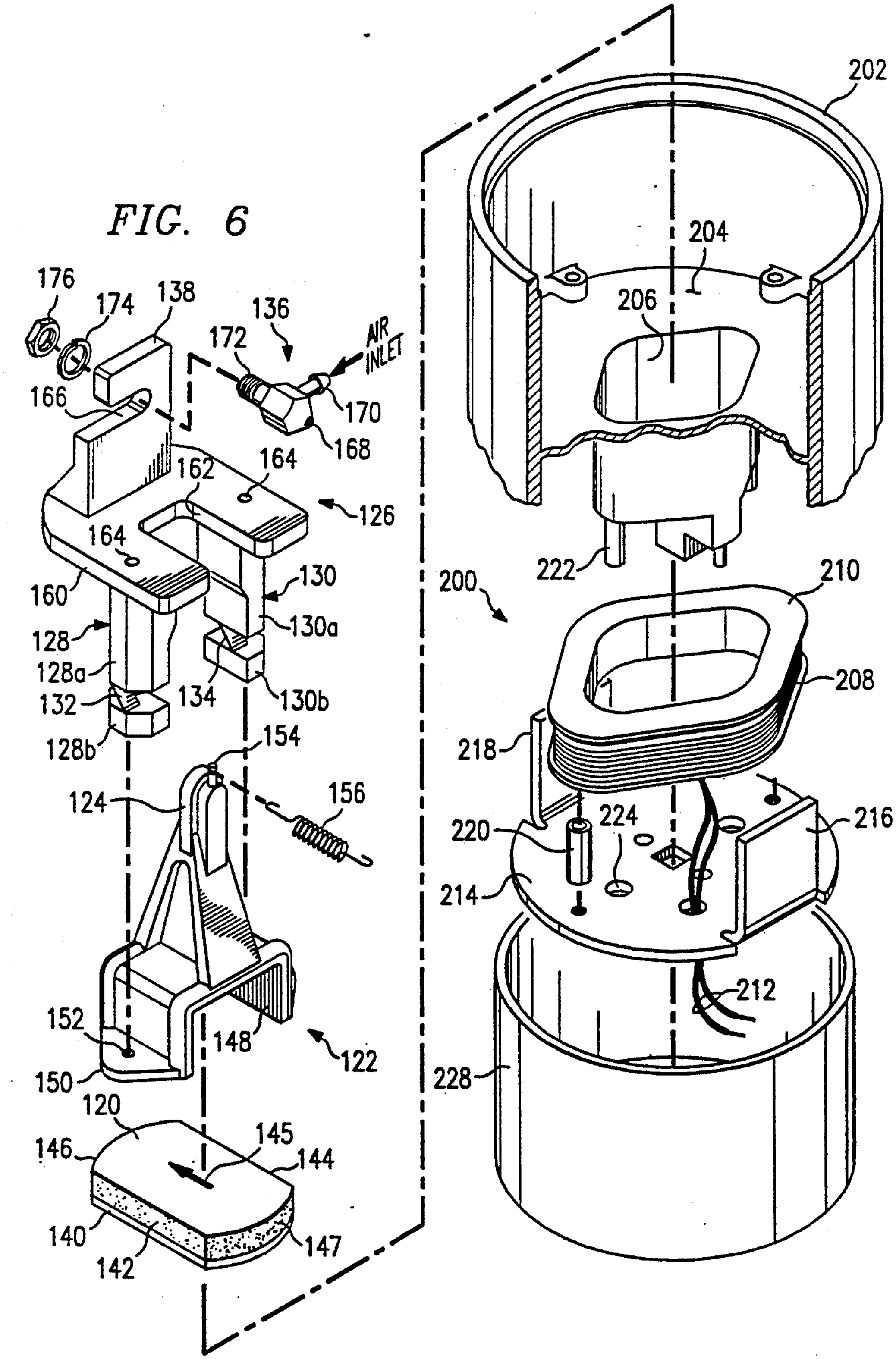
FIG. 6 is an isometric view of the major components of the transducer according to the preferred embodiment of the invention.

FIG. 6 depicts the principles and concepts of the transducer of the preferred embodiment of the invention. A high energy permanent magnet 120, such as a neodymium-iron-boron magnet, is fixed to a saddle structure 122 which includes an extension defining a flapper arm 124. Fixed to the base of the saddle structure 122 is a nozzle assembly 126. The nozzle assembly 126 includes a pair of depending leg structures 128 and 130, each formed as two parts **128*a* and 130*a*, and 128*b* and 130*b* connected by respective cross flexure hinges 132 and 134. The nozzle assembly lower legs 128*b* and 130*b* are fixed, such as by thermal bonding, to the base of the saddle structure 122. In this manner, the saddle structure 122 and attached permanent magnet 120 can pivot with respect to the nozzle assembly 126. The flexure strips forming the bearing to the magnet 120 are about 0.003 inch thick, and thus a great deal of flexibility is provided for pivotal movement of the magnet 120. More particularly, the permanent magnet 120 is pivoted under the influence of a magnetic field which pivots the saddle structure 122, and thus the flapper arm 124, about an axis extending through the flexure strips 132 and 134 and the center of the magnet 120. By rotating the magnet 120 about a central axis therethrough, undesirable moment arms of the saddle assembly 122 are minimized. The existence of a moment arm with respect to the saddle assembly 122 would respond to vibration and produce undesired modulations of the output pressure. As will be described in more detail below, the end of the flapper arm 124 moves with respect to a nozzle 136 that is fixed to a frame structure 138 of the nozzle assembly 126. While the flapper arm 124** is described herein as controlling a pressure, it can be used for many other functions in many other applications.

The magnet 120 is bonded or otherwise suitably fixed to a similarly-shaped counterweight 140 that is constructed of a non-magnetic material, such as stainless steel (300 series) or brass. The magnet 120 and the counterweight 140 are fabricated from circular discs, but with the opposing linear edges 142 and 144 such that the arcuate ends 146 and 147 subtend an arc of about 80°. The removed pieces of the magnet from the linear edges do not substantially affect the magnetic strength thereof, as the magnet 120 is cross-polarized, in the direction noted by arrow 145. In other words, a major portion of the magnetic lines of force exit and enter the rounded ends 146 and 147 of the magnet 120, and very few lines of force are lost because of the removed pieces of the magnet 120. The concentration of magnetic flux at the circular ends 146 and 147 of the magnet 120 is advantageous when used with the diamond-shaped coil winding to be described in more detail below.

Dimensionally, the magnet 120 is about 0.875 inches between the rounded ends 146 and 147 and is about 0.562 inch between the opposing linear sides 142 and 144. The thickness of the magnet 120 is about 1.87 inch. The counterweight 140, constructed of stainless steel in the preferred embodiment, is of a thickness sufficient to balance the flapper arm 124 and the magnet 120 about an axis about which the magnet pivots. It can be appreciated that the weight of the counterbalance 140, if it is needed at all, is a function of the shape and material from which the saddle structure 122 is constructed, the length of the flapper arm, the size of the magnet 120, and other readily recognizable factors. Indeed a counterbalance structure may be required on the flapper arm 124 itself to offset the weight of the magnet 120. In any event, it is preferred to balance the saddle structure 122 and magnet 120 so that the transducer operation is insensitive to physical orientation.

The magnet 120 and counterweight 140 are bonded by an epoxy cement, or other suitable material, within a U-shaped portion 148 of the saddle structure 122. The U-shaped section 148 includes opposing ears 150 defining a base to which the bottom leg parts 128*b* and 130*b* of the nozzle assembly 126 are bonded. As noted above, the saddle structure 122 has formed integral therewith the flapper arm 124 which moves in correspondence with the pivotal movement of the magnet 120. Each saddle ear 150 has formed therein a hole 152 for receiving a pin formed on the bottom end of the respective bottom leg part 128*b* of the nozzle assembly 126. Alignment and registration of the transducer parts 122 and 126 is thereby facilitated. In the alternative, the transducer plastic parts 122 and 126 could be molded as a unitary part, albeit at the expense of complicating the molds.

In the preferred form of the invention, the saddle structure 122 is molded with a glass reinforced polyethylene terephthalate thermoplastic material. Plastics suitable for use with the invention are obtainable from the General Electric Company under the trademark of Valox®, or alternatively Ultem®. By utilizing such a material, the saddle structure 122 and the nozzle assembly 126 are easily formed and thereby cost effective, are lightweight and thus increase the mechanical resonant frequency, are stable with temperature, corrosion resistant and non-magnetic so that undesired magnetic paths are not presented to the magnetic field of either the magnet 120 or a coil winding.

The saddle structure 122 further includes at the end of the flapper arm 124 a hook 154 for attachment thereof to the end of a bias spring 156. As will be described in more detail below, the bias spring 156 provides a mechanical feedback between the flapper arm 124 and a process control valve stem (not shown) that is moved as a result of the movement of the magnet 120. The length of the flapper arm 124 with respect to the magnet 120 is chosen such that the flapper arm end moves a desired amount in correspondence with a certain pivotal movement of the magnet 120. As can be appreciated, the magnet 120 pivots about a horizontal axis extending through the flexure strips 132 and 134, which axis is orthogonal with respect to the polarization vector 146 of the magnet 120. Accordingly, as the magnet 120 is rocked or pivoted in response to magnetic field generated by a coil winding, the flapper arm 124 moves with respect to an orifice of the nozzle 136.

The nozzle assembly 126 is also molded as an integral unit of a lightweight and low cost plastic material, such as the type noted above. In the alternative, the various parts of the nozzle assembly 126 can be individually molded as separate parts, and bonded together as an integral unit. The downwardly depending leg assemblies 128 and 130 are molded or bonded to a plate 160 having a cutout section 162 for accommodating the flapper arm 124. The plate 160 includes a pair of holes 164 for mounting the nozzle assembly 126 with respect to a housing (not shown) of the transducer. Molded integral with, or fixed to, the nozzle assembly plate 160 is an upright frame 138, also including a bore or notch 166 for receiving therein the nozzle 136, preferably, the notch 166 is elongate in one or two directions to allow the nozzle 136 to be vertically or horizontally adjusted in registry with the flapper arm 124. While the nozzle 136 will be described more thoroughly below, it is sufficient to understand that the nozzle 136 includes an orifice 168 connected through an internal channel within the nozzle 136 to an air inlet stem 170. The air inlet stem 170 is preferably formed for attachment to a rubber or plastic tube that is connected through a restrictor to a supply of air pressure. The nozzle 136 includes a threaded stud 172 and a washer 174 and nut 176 for fastening to the nozzle frame 138.

Figure 7:
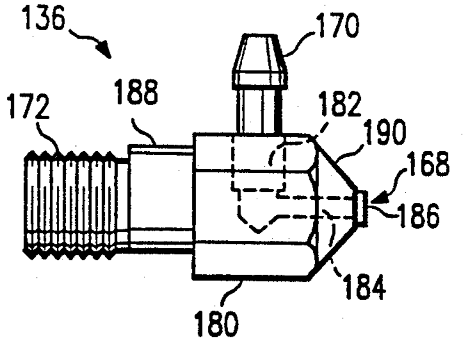
FIG. 7 is an enlarged view of the nozzle of the invention.
Figure 8:
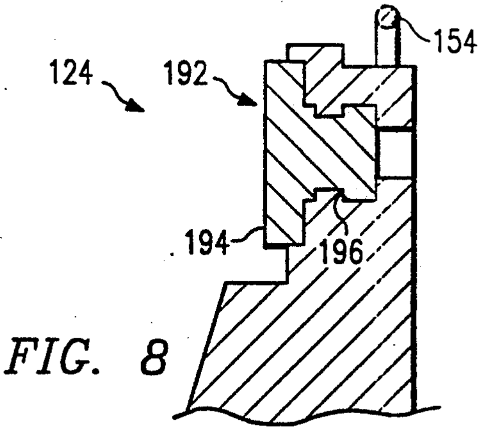
FIG. 8 is an enlarged view of the flapper arm structure according to the invention.

With reference to FIGS. 7 and 8, there is illustrated the structural features of the nozzle 136 and the end of the flapper arm 124 that coacts by way of air pressure with the nozzle 136. The nozzle 136, including an air inlet stem 170 and a nozzle body 180, are constructed of stainless steel or other corrosion resistant and durable material. The air inlet stem 170 is brazed or otherwise welded to the nozzle body 180 in axial registry with a bore that includes right angle internal channels 182 and 184. The axial bore 184 communicates with an orifice sleeve 186 that is formed of a hardened material, such as stainless steel. The nozzle sleeve 186, defining the orifice 168, may be of various diameters, depending upon the response required. In the preferred form of the invention, the diameter of the orifice 168 is about forty thousandths inch diameter, and air uder pressure is supplied to the stem 170 through a restrictor. Preferably, a restrictor (not shown) is interposed in the line between the nozzle 136 and the supply of air pressure. Formed integral with the nozzle body 180 is a threaded stud 172 axially centered with respect to the nozzle body 180. An intermediate shank 188 is displaced from the axis of the nozzle body 180. The offset nature of the shank 188 allows the nozzle orifice 168 to be adjusted with respect to the flapper arm 124 by rotating the nozzle 136 appropriately and then fastening it to the nozzle assembly frame 138. Importantly, the nozzle body 180 includes a face surface 190 surrounding the orifice 168, and tapers radially outwardly in rearward direction away from the orifice 168. The angle of taper of the nozzle face 190 with respect to the axial axis of the nozzle body 180 is about 45°. The tapered face 190, in conjunction with the structure of the flapper arm 124, provides increased linearity between the pressure of the air exiting the nozzle 136 and the force exerted on the flapper arm 124. In other words, with such a construction, the pressure of air exiting the orifice 168 is accurately converted in a linear manner to a force acting on the flapper arm 124.

The terminal end of the flapper arm 124 is shown in FIG. 8. Here, a metal button assembly 192 is formed, or otherwise fixed, within the plastic material of the flapper arm 124. Ideally, the button 192 includes a circular face portion 194 having a diameter in the range of about 0.1 to 0.2, inches and preferably about 0.15 inch. Further, the button 192 includes a shouldered rim 196 for forming therearound the plastic material to set and anchor the button 192 within the flapper arm 124. Preferably, the button 192 is constructed of an extremely hard material for wear resistance, such as 440 type steel. As noted above, the coaction of the air pressure between the nozzle 136 having the structure shown, and the flat face surface of the flapper arm button 192 provide a linear conversion of the force experienced on the flapper arm 124 by the air pressure exiting the nozzle orifice 168. As will be described in more detail below, a preset distance between the nozzle orifice 168 and the flapper arm button 192 is established during manufacturing of the transducer unit. Also to be described more thoroughly below, the air flow in the system is maintained laminar to reduce nonlinearities of the system.

With respect now to FIG. 6 again, there is depicted a coil winding assembly 200 constructed according to the invention. Shown also is a portion of the transducer housing 202. The housing 202 is formed of a non-magnetic material, such as cast aluminum. Formed integral with the housing 202 is a divider wall 204 having a diamond-shaped well 206 for receiving therein the magnet 120 and corresponding saddle structure 122. The divider wall 204 and the sidewalls and bottom of the well 206 provide isolation between the electrical components and circuits located therebelow, and the movable magnet 120 and saddle structure 122 suspended within the well 206. Disposed circumferentially about the sidewalls of the well 206 is a coil winding 208 wrapped around a diamond-shaped plastic frame 210. A pair of wires 212, comprising the ends of the coil winding 208, exit the assembly 200 for connection to a circuit board (not shown). The rounded ends 146 and 147 of the magnet 120 are positioned within the coil 208 so as to be adjacent to obtuse angled sections thereof. The linear sides 142 and 144 of the magnet 120 and the flexure strips 132 and 134 are disposed in the coil 208 so as to be adjacent the acute angled sections of the coil 208. This construction advantageously allows a maximum number of flux lines from the rounded ends of the magnet 120 to coact with a major portion of the coil 208, thus optimizing coupling efficiency. The acute angle sections of the coil 208 comprise a minor portion of coil 208, and are adjacent the linear sides of the magnet 120 which produce the least number of flux lines. The shape of the coil 208 and the cross-polarized magnet 120 thus provide a compact magnetic interacting circuit that has a high coupling efficient.

The coil assembly 200 further includes a bracket 214, constructed of a magnetic material such as cold rolled steel, to which the coil frame 210 is fixed. The coil bracket 214 includes a bottom plate with a pair of opposing side tabs 216 and 218 formed orthogonal to the bottom plate. The bracket 214 and the side tabs 216 and 218 comprise a primary return path for the magnetic flux of the magnet 120. The tabs 216 and 218 are longer than the thickness of the magnet 120 to ensure that there is magnetic attraction between the magnet and both tabs. The diamond-shaped coil frame 210 around which the coil winding 208 is wound is fastened to the bracket plate with a pair of tubular supports, one shown as 220. A fastener can be passed through a hole in the bracket plate, through the tubular support 220 and into the plastic material of the coil frame 210. The coil bracket 214 is fastened with respect to the housing well 206 so that the coil 208 surrounds the well 206 at a location to exert a magnetic influence on the magnet 120 which is suspended within the well 206. Formed on the bottom of the well 206 are a pair of supports, one shown as reference numeral 222, each having internal threaded bores. The bottom plate of the coil bracket 214 includes a corresponding pair of spaced-apart holes 224 through which a screw is passed and threaded into the reactive supports 222. In this manner, the coil bracket 214, and thus the coil 208 itself, are fastened in a fixed position about the well 206. While the coil assembly 200 is shown constructed with a bracket 214, those skilled in the art may find that it is advantageous to form a shoulder on the outer sidewalls of the well 206, and cement or otherwise bond the coil 208 and frame 210 thereto directly around the well 206.

Disposed about the coil assembly 200 is a metallic, cylindrical-shaped magnetic shield 228. The shield 228 essentially lines the inside cylindrical surface of the housing 202, under the divider 204, thereby preventing external magnetic fields or electromagnetic interference signals from affecting the magnet 208. In like manner, the shield 228 also prevents the electromagnetic fields generated by currents in the coil 208 from affecting equipment external to the transducer. More importantly, the shield 228 provides a secondary return path for flux lines exiting the north pole of the magnet 120 and extending through the coil 208, and reentering the south pole of the magnet 120. As noted above, the coil bracket 214 and upturned tabs function as a primary return path for the magnetic flux lines generated by the magnet 120 and the coil 208. Additionally, the coil bracket 214 provides shielding of the magnetic flux when adjusting tools, such as a screwdriver, are inserted into the transducer to provide span, zero or other adjustments. A screwdriver otherwise would upset the magnetic field during adjustment, and when removed, the magnetic circuit of the transducer would be changed and the adjustment would effectively change.

It is important to note that the material from which the housing divider 204 and the well 206 is constructed is non-magnetic and does not interfere with the magnetic coupling between the coil 208 and the magnet 120 suspended within the well 206. Aluminum, brass, copper or other non-magnetic materials are well suited for forming the housing divider 204 and well sidewalls and bottom wall 206. In the preferred form of the invention, a cast aluminum metal is chosen for the construction of the transducer housing 202, including the divider 204 and the well 206, as such material has about the same electrical permeability as that of air and thus does not substantially interfere with the magnetic coupling between the coil 208 and the magnet 120. In addition, the cast aluminum material is conductive and thereby provides eddy current dampening of the magnet 120. Without eddy current dampening, a fast change in the current would result in a magnet movement that would overshoot a correct position, and oscillate back and forth and settle to the desired position. Such an oscillation in the movement of the magnet 120 produces corresponding flapper arm movements and undesired modulation of the output air pressure. Eddy current dampening functions as a brake and thus reduces the overshoot of the magnet. The divider 204 and the well 206 function as a shorted turn transformer secondary to induced magnetic fields, thus braking the oscillatory movements of the magnet 120.

Figure 9:
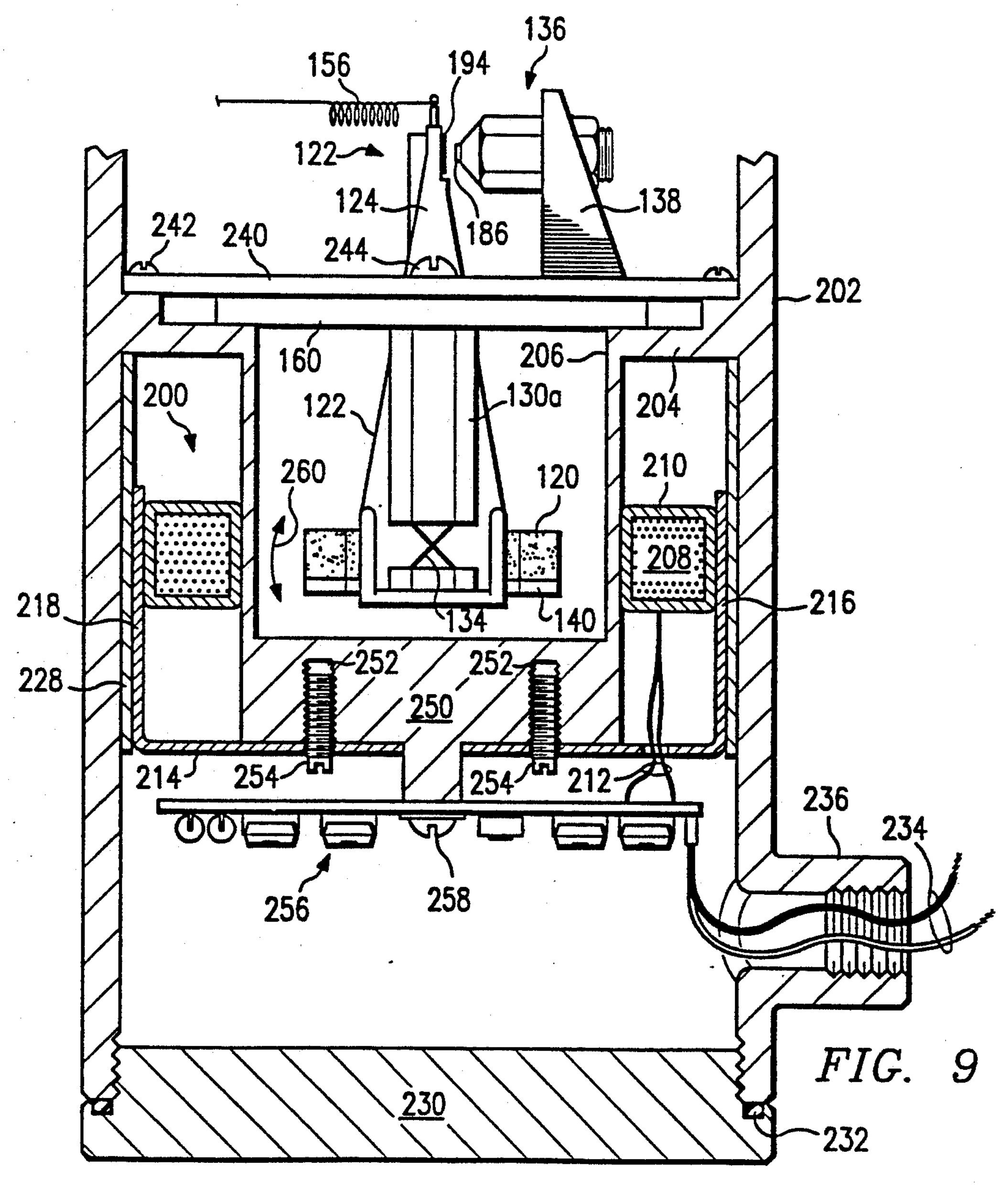
FIG. 9 is a cross-sectional view of the transducer of the invention.

With reference now to FIG. 9, there is shown a cross-sectional view through a portion of the transducer constructed according to the invention. As noted, the housing 202 is separated into two compartments for purposes of explosion proofing the device, by the divider 204 and the well 206. The current-carrying electrical components can be housed within the bottom compartment of the housing 202 and isolated from the external environment by a bottom cap 230 which is threaded to the housing 202 and sealed thereto by an annular 0-ring 232. The electrical conductors 234 which enter the transducer housing 202 by an integral threaded connection 236 can also be enclosed by suitable conduits or a piping which are also explosion proofed. As can be appreciated, the magnet 120 and the nozzle assembly 126 are disposed in an upper compartment of the housing 202 which need not be constructed to meet explosion proof standards.

The nozzle assembly 126 and attached saddle 122 and magnet 120 are fixed to a circular plate 240 that is secured within the housing 202 by a number of screws 242. The nozzle assembly 126 is fastened to the circular plate 240 by a pair of screws, one shown as reference numeral 244, that clamp the circular part 240 and the nozzle assembly plate 160 together. The nozzle assembly plate 160 rests between the circular plate 240 and the housing divider 204, thereby allowing the magnet 120 to be suspended within the well 206 a predefined distance. Preferably, the magnet 120 is suspended within the well 206 so that it is disposed and centered within the coil winding 208. By constructing the flapper arm 124 and the saddle of a plastic material, and by utilizing a small, but high energy magnet, the resonant frequency of the movable parts is generally out of range of the vibrational movements of equipment such as pipelines and fluid pumps. The resonant frequency of the transducer of the preferred embodiment is in the range of 40–60 Hz which is substantially higher than the 10–20 Hz resonant frequency characteristics of other well known transducers. As noted in FIG. 9, the nozzle 136 is fixed to the nozzle bracket 138. While the nozzle 136 can be adjusted by virtue of the offset shank 188 and the frame slot 166, the nozzle 136 is otherwise nonadjustable with respect to its spacing from the flapper arm 124. Rather, and to be described in more detail below, the spacing between the nozzle sleeve 186 and the flapper arm button 194 is adjusted to a quiescent or rest distance by adjusting the flapper arm 124.

Figure 12:
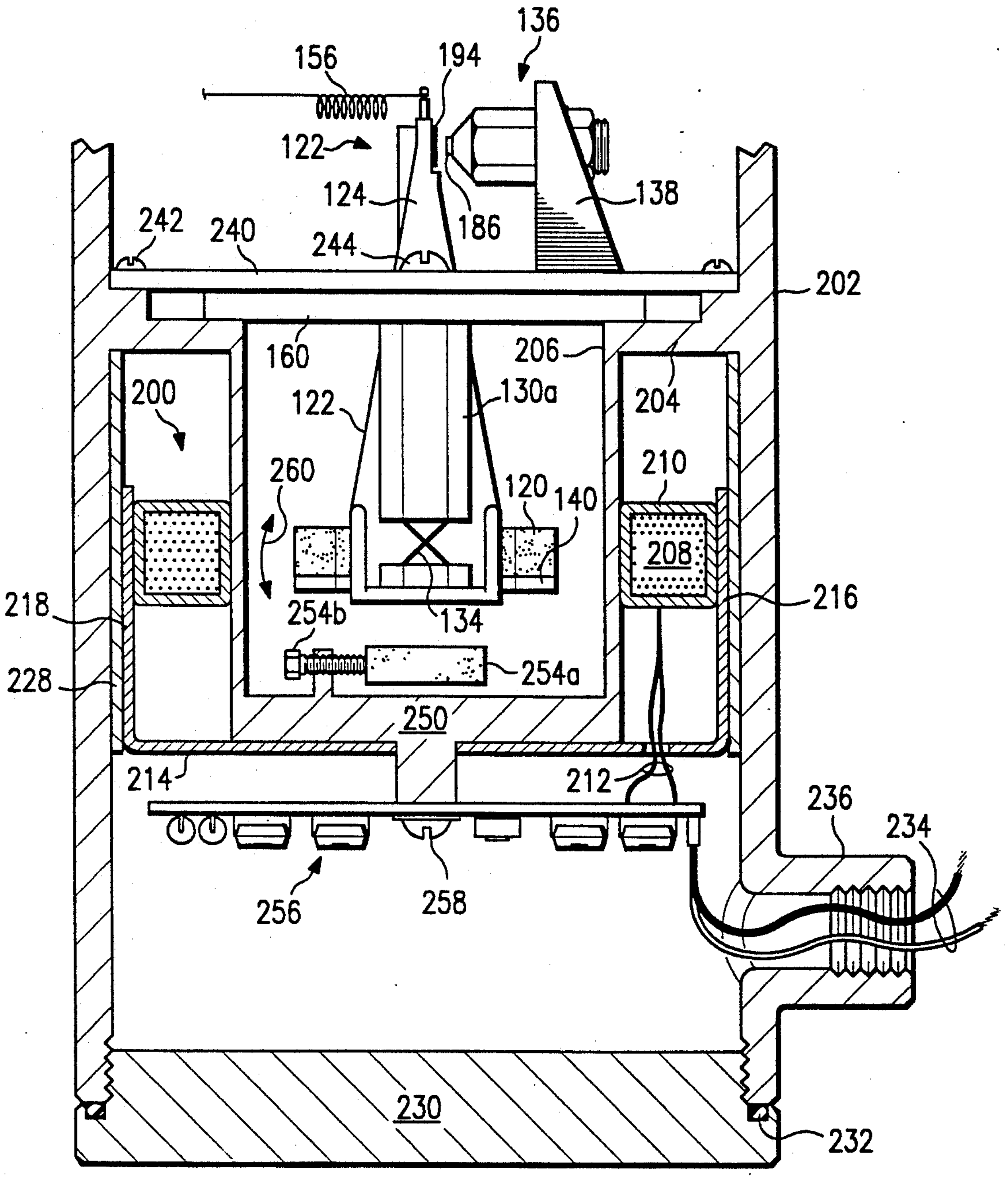
FIG. 12 is a cross-sectional view of the transducer of another embodiment of the invention.

As described above, the coil assembly 200 is fixed about the outer sidewalls of the well 206 to place the coil 208 circumferentially around the magnet 120. In the preferred embodiment of the invention, in a quiescent position of the magnet 120, i.e., without the influence of a magnetic field from the coil 208, the separation between the edges of the magnet 120 and the coil 208 is about 0.1 and 0.2 inch. Formed in the bottom of floor 250 of the well 206 are a pair of threaded bores, one shown as reference numeral 252. As can be seen, the threaded bores 252 need not be formed completely through the bottom 250 of the well 206, and for explosion proof purposes, indeed should not be formed through the material. A pair of Allen or set screws, 254 are threaded into the bores 252. The screws 254 are preferably constructed of a magnetic material, such as carbon steel, to provide a magnetic bias, or a coarse zero setting, with respect to the magnet 120. The screws 254 are adjusted in the threaded bores 252 with respect to the magnet 120 so as to move the magnet 120 a minute amount to a rest position and thereby adjust the distance between the flapper arm button 194 and the nozzle orifice sleeve 186. It can be appreciated that the adjustment of one screw is effective to move the flapper arm 124 toward the nozzle 136, while the adjustment of the other screw is effective to move the flapper arm 124 away from the nozzle 136. Accordingly, by adjusting one or both of the screws 254, a precise spacing between the flapper arm button 194 and the nozzle sleeve 186 can be established. The spacing between the flapper arm 124 and the nozzle 136 is established without current flowing through the coil 208. As an alternative arrangement, illustrated in FIG. 12, the screws 254 can be eliminated, and a small permanent magnet 254*a* can be fastened to the well 206 to bias the larger magnet 120 to a preset position. The smaller bias magnet 254*a* would be adjustably positioned by adjustment means 254*b* with respect to the larger magnet 120 to provide a coarse zero setting. Further adjustments can be made in external electrical circuits to achieve a fine adjustment of the magnet 120.

A circuit board 256 having electrical components is fastened to the bottom 250 of the well 206 by a screw 258. The terminal conductor ends of the coil 208 are routed through an opening in the coil bracket 214 and connected to the circuit board 256. The circuit board 256 may include circuits for adjusting zero, span and other parameters for optimizing performance of the transducer. The transducer of the invention is especially adapted to respond to 4–20 milliamp currents carried by conductors 234 to the circuit board 256, whereupon the coil 208 is driven by corresponding currents. Circuit components, such as thermistors and the like may be utilized to provide temperature compensation for the magnetic characteristics of the magnet 120. Those skilled in this field can readily devise compensation circuits to produce positive temperature coefficients to offset the negative temperature coefficient of neodymium-iron-boron magnets, and vice versa. When the coil 208 is energized by specified magnitudes of DC current, the magnet 120 will pivot, as noted by arrow 260, about the axis of the flexures 134. The magnet 120 pivots to an angular extent that is proportional to the current carried by the coil 208. In like manner, the extent of pivotal movement of the magnet 120 is proportional to the movement of the flapper arm 124 to thereby vary the distance between the nozzle 136 and the flapper arm 124. The spacing between the flapper arm button 194 and the nozzle orifice sleeve 186 results in a corresponding pressure in a pneumatic circuit connected to the nozzle 136. As is well known in the art, a greater spacing between the flapper arm 124 and the nozzle 136 causes a decreased pressure within the nozzle, while a closer spacing between the flapper arm 124 and the nozzle 136 causes an increased pressure within the nozzle.

According to an important feature of the invention, and as noted above, attached to the magnet 120 is a counterweight 140 for balancing the magnet 120 and the saddle structure 122 about the pivotal axis passing through the flexures 132 and 134. In other words, the counterweight 140 is selected as to size, material, etc., so that the mass of the material on each side of the pivotal axis of the flexures 132 and 134 is substantially equal. With this construction, the flapper arm 124 is balanced and spaced apart from the nozzle 136, irrespective of the physical orientation of the transducer. The advantage afforded with this feature is that the transducer can function with the same performance, and without adjustment, if the transducer is operated in the orientation shown in FIG. 9, or turned 90°.

While the transducer has been described in connection with flexure strips and a permanent magnet, those skilled in the art may find that other structures can be utilized. For example, while flexure strips are cost effective, a traditional bearing can be used. Also, an electromagnet can be substituted for the permanent magnet, with flexible wires connected to a source of DC current to provide a magnetic field for coacting with that of the fixed coil winding.

Figure 10:
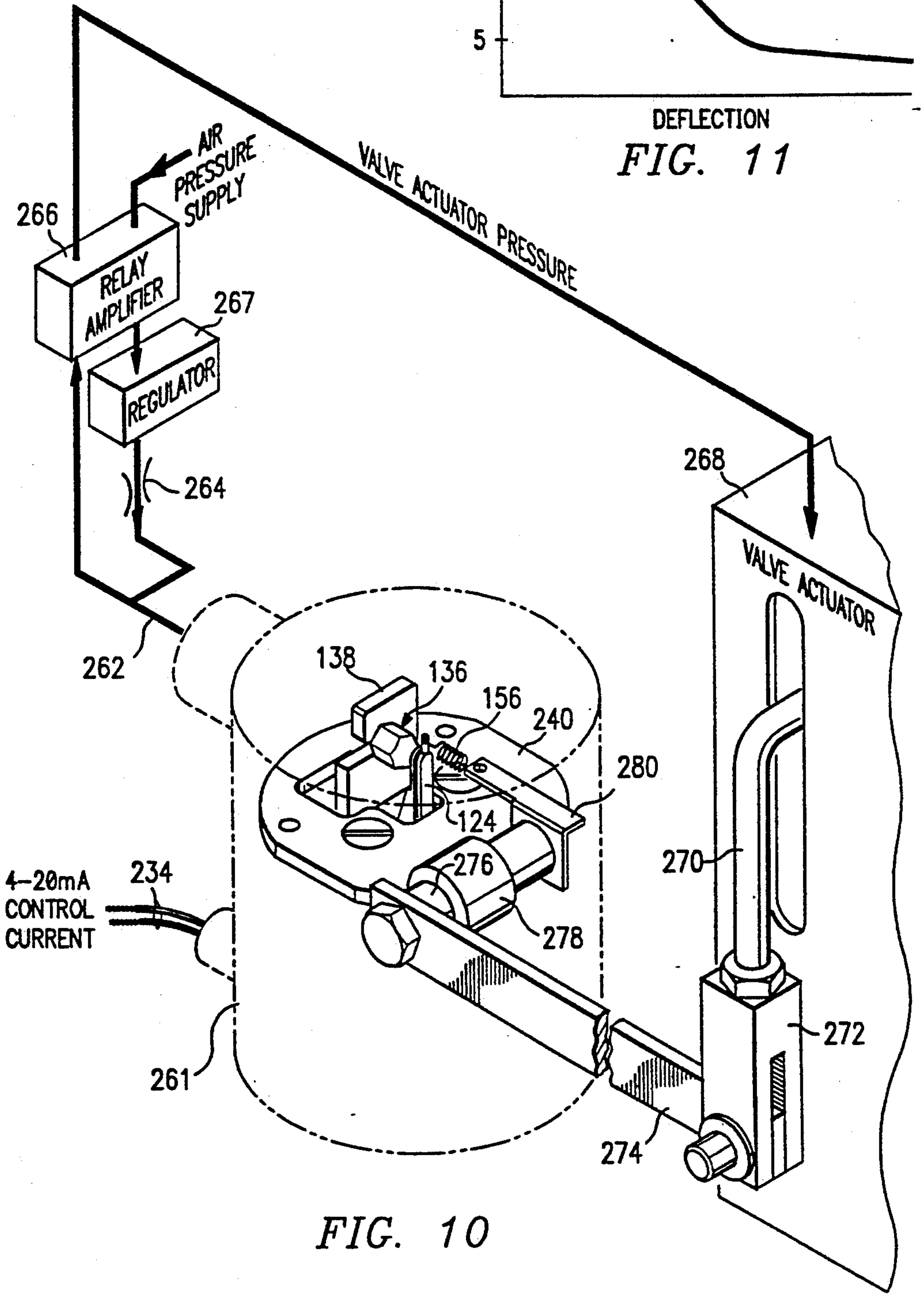
FIG. 10 is a diagrammatic view of an electropneumatic pressure system incorporating the transducer of the invention.

FIG. 10 is illustrative of a process control application in which the transducer of the invention can be advantageously practiced. In such an application, the transducer 261 is responsive to a DC current of a specified magnitude on input conductors 234 for providing a corresponding pneumatic pressure on an output 262. Preferably, the transducer 261 converts a 4–20 milliamp input current to a corresponding pressure change on the pneumatic output 262, which, when biased upwardly by the relay 266, will drive the valve to the desired position. The pressure change in line 262 comprises a ΔP of about 1.2 psi for full scale operation. As further noted, an air pressure supply nominally provides about 20 psi of pressure to an input of the relay 266. A corresponding output of the relay 266 is coupled to a regulator 267, and regulated air is supplied through a restrictor 264 to the output pneumatic line 262. The air pressure produced at the output pneumatic line 262 is coupled through suitable piping or hoses to another input of relay amplifier 266. A corresponding output of the relay 266 biases the ΔP input on line 262 upwardly to a corresponding pressure operable to move a valve between extreme positions. Relay amplifiers are well known in the art for boosting the input air pressure by specified amounts to produce corresponding output pressures. In the example, the pneumatic relay 266 has a gain of about ten, and thereby multiplies the pressures input thereto by a factor of ten. An air pressure corresponding to an input transducer current is coupled from the output of the pneumatic relay 266 to a valve actuator 268 for controlling a process control valve and thereby control a fluid in a pipeline to which the valve is connected. The valve actuator 268 is responsive to the pneumatic input pressure for setting the valve to a corresponding position with respect to a valve seat. Accordingly, the 4–20 milliamp input current is converted into a corresponding pressure to which the valve actuator is responsive to accurately position the valve.

The valve actuator 268 includes a mechanical feedback arm 270 which moves in correspondence with the stem (not shown) of the valve. The mechanical connection between the valve actuator and the transducer 260 comprises a feedback system for stabilizing the system. The feedback apparatus includes the actuator arm 270 that moves up and down in correspondence with the valve stem. Typical valve stem movements may be in the range of one-half inch to four inches, full scale. The end of the arm 270 is connected to a clevis 272 that is pivotally connected to a lateral arm 274. The other end of the lateral arm 274 is fixed to a shaft 276 that is rotated within a fixed bearing 278. The other end of the shaft 276 is, in turn, fixed to an arm 280 that moves in unison with the lateral arm 274. A weak spring 156 providing only ounces of tension is connected between the end of the arm 280 and the flapper arm 124.

With respect to the air flow characteristics in the control portion of the system, it should be noted that the regulator 267 is adapted to provide a pressure drop of about 2.5 to 3.0 psi across the restrictor 264. The air flow therethrough is thus maintained laminar, as is the air coupled through the nozzle 136 to the flapper arm 124. The linearity of the system is thus optimized. The restrictor 264 comprises a fixed orifice which produces a constant pressure thereacross, due to a pressure feedback through the line 262, through the relay 266, and internal to the relay 266 to the regulator 267.

Figure 11:
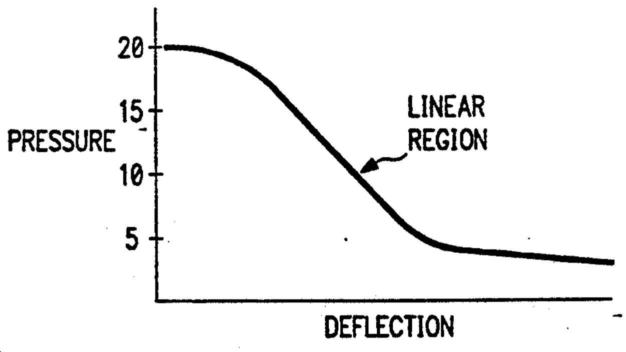
FIG. 11 graphically depicts the relationship between nozzle pressure and flapper arm deflection of the transducer.

With brief reference to FIG. 11, there is graphically illustrated the relationship between the pressure within the nozzle 136 and the displacement of the flapper arm 124. As can be seen, for high and low nozzle pressures, the deflection is nonlinear. However, for intermediate nozzle pressures of about 6–12 psi, the deflection is rather linear. Thus, by maintaining the nozzle pressure between about 6 and 12 psi, the deflection of the flapper arm is linear. As Can be appreciated, the nozzle 136 and flapper arm 124 Comprise a variable orifice. This arrangement produces a laminar flow of air through the nozzle which, together with the nozzle 136 and flapper design, provide a high degree of linearity between the nozzle air pressure and the deflection of the flapper arm 124.

In operation of the process control system of FIG. 10, if the valve is desired to be set at a particular position, a corresponding DC current is input to the transducer 261 via the conductors 234. The current through the coil 208 generates a corresponding magnetic field that influences the permanent magnet 120. In the region where the magnetic field of the coil 208 opposes the magnetic field of the permanent magnet 120, the magnet end 146 or 147 will tend to move away from the coil. In the region where the magnetic field of the coil 208 and the permanent magnet 120 attract each other, the other magnet end 147 or 146 will move toward the coil. Because the magnet 120 is constrained for movement about the pivotal axis through the flexure strips 132 and 134, the magnet pivots according to arrow 260. The pivotal movement of the magnet 260 causes a corresponding, but opposite pivotal movement of the flapper arm 124, thereby changing the space between the flapper arm button 194 and the nozzle orifice 168. If the change in input current was in a direction to move the flapper arm 124 away from the nozzle 136, then the air pressure in the output pneumatic line 262 will decrease. On the other hand, if the current input to the transducer 261 was in a direction to move the flapper arm 124 closer to the nozzle 136, then the air pressure in the output pneumatic line 262 will increase. The relay 266 will amplify the pressure by a constant factor, such as 10 noted in the example above. The amplified pressure output by the relay 266 is sufficient to operate the valve actuator 268 which positions the valve accordingly. If the pressure coupled to the valve actuator 268 increased, and if such increase moves the valve stem and the arm 270 downwardly, then the lateral arm 274 of the feedback system would pivot about shaft 276 in a downward direction. Such a movement has the effect of moving the arm 280 away from the transducer 261, thereby applying a force through the spring 156 to move the flapper arm 124 away from the nozzle 136. A balanced condition will be established when the flapper arm 124 is a certain distance from the nozzle 136, and the current input to the transducer 260 corresponds to the new valve setting. It can be seen that two opposite forces act on the flapper arm 124, one from the pivotal movement of the magnet in response to an input current,, and the other from the movement of the valve itself. For each incremental increase or decrease in the input current of the transducer 261, the actuator 268 will change the position of the valve stem so that there will be an opposite and equal force exerted by the spring 156 on the flapper arm. Hence, the process control system of FIG. 10 will convert input current over a specified range in a linear manner to corresponding valve stem movements. In order for the control system shown in FIG. 10 to operate satisfactorily, the gain of the system must be sufficiently high. To that end, the combination of the high magnetic strength of the transducer magnet 120 and the gain of the relay 266 allow the control system to operate optimally.

While various types of valves are available for this purpose, including rotary actuated valves and linear actuated valves, normally open valves, normally closed valves, etc., the actuator 268 can appropriately move a valve stem so that with a range of input pressures, the valve can be moved between a completely closed position and a completely open position. With intermediate pressures output by the relay 266, the valve will be placed at a corresponding intermediate position. Further, those skilled in the art can readily adapt the foregoing principles and concepts to process control systems having rotary valve actuators for controlling rotary actuated valve. In the event a rotary actuated valve is employed, the rotating arms or other apparatus of the valve stem can be coupled to the rotating shaft 276 of the transducer linkage. The transducer and shaft 276 can be oriented sideways so that the axes of rotation of both the shaft 276 and the valve are oriented vertically. Other orientations of both the transducer 261, its linkage, and the valve or valve actuator are, of course, possible.

From the foregoing, disclosed is an improved transducer having numerous technical advantages. An important technical advantage presented by the invention is that an accurate and reliable transducer can be constructed at a cost-effective price. Another technical advantage of the invention is that by employing a movable permanent magnet in association with a fixed winding, explosion-proofing the unit is facilitated. A related technical advantage of the explosion-proofing technique of the invention is that flame arrestor apparatus is not required for operating the transducer. Yet another technical advantage of the invention is that by employing a neodymium-iron-boron permanent magnet having an extremely high intensity magnetic field, the transducer can be fabricated more compactly to better utilize the available input current and achieve a high gain. An associated technical advantage of the foregoing is that by utilizing a small permanent magnet, but with a high magnetic intensity, the response time thereof to changes in current are maintained in correspondence, whereby faster transitions of the coil currents are followed by corresponding positional changes in the permanent magnet. A further technical advantage of the invention is that vibration modulation of the transducer output is reduced due to its high resonant frequency. The invention provides yet another technical advantage for rest position adjustment, in that the permanent magnet can be magnetically biased by one or more screws adjusted with respect to the magnet. Another technical advantage of the electropneumatic positioner of the invention is a nozzle-flapper arm arrangement that provides a linear conversion between air pressure and force on the flapper arm.

While the preferred and other embodiments of the invention have been disclosed with reference to specific transducer constructions, and methods of fabrication thereof, it is to be understood that many changes in detail may be made as a matter of engineering choices without departing from the spirit and scope of the invention, as defined by the appended claims.

What is claimed is:

1. A transducer comprising:

a coil winding for generating a magnetic field responsive to an electrical input to said coil winding;

a magnet for producing a pivotal movement in response to the thus generated magnetic field;

at least one bearing attached to said magnet for allowing pivotal movement of the magnet about an axis, extending through said magnet, in response to said magnetic field;

a bearing support structure to which said at least one bearing is attached for suspending said magnet and said at least one bearing within the space encompassed by said coil winding;

an arm attached to said magnet for providing a mechanical output from said transducer in response to an electrical input to said coil winding; and a counterweight attached to one of said arm and said magnet to provide balance about an axis extending through said at least one bearing.

2. A transducer comprising:

a coil winding for generating a magnetic field responsive to an electrical input to said coil winding;

a magnet for producing a pivotal movement in response to the thus generated magnetic field, wherein said magnet has a shape defined by rounded opposing ends and linear opposing sides;

at least one bearing attached to said magnet for allowing pivotal movement of the magnet about an axis, extending through said magnet, in response to said magnetic field; and a bearing support structure to which said at least one bearing is attached for suspending said magnet and said at least one bearing within the space encompassed by said coil winding.

3. A transducer in accordance with claim 2, wherein each bearing is connected to a respective linear side of said magnet.

4. A transducer in accordance with claim 3, wherein said winding is generally diamond-shaped for surrounding said magnet and said bearing support structure.

5. A transducer comprising:

a coil winding for generating a magnetic field responsive to an electrical input to said coil winding;

a magnet for producing a pivotal movement in response to the thus generated magnetic field;

a housing for enclosing said winding and said magnet, said housing having a divider for defining two compartments each isolated from the other, said housing including a well formed in said divider;

at least one bearing attached to said magnet for allowing pivotal movement of the magnet about an axis, extending through said magnet, in response to said magnetic field; and a bearing support structure, to which said at least one bearing is attached, for suspending said magnet and said at least one bearing within the space encompassed by said coil winding; and wherein said magnet is suspended in said well in one of said compartments by said bearing support structure, and said winding is disposed around said well in the other of said compartments.

6. A transducer in accordance with claim 5 wherein each said bearing comprises a pair of flexure strips, and wherein said bearing support structure comprises a pair of support elements with each support element being connected to said magnet by a respective pair of flexure strips.

7. A transducer in accordance with claim 6 wherein said magnet has a shape defined by opposing rounded ends and opposing linear sides, wherein each bearing is connected to a respective linear side of said magnet, and wherein said coil winding is generally diamond-shaped for surrounding said magnet and said bearing support structure.

8. A transducer in accordance with claim 5, further comprising:

a flapper arm mounted with respect to said magnet to produce a movement of said flapper arm corresponding to the thus produced pivotal movement of said magnet.

9. A transducer in accordance with claim 8, further comprising:

a supply line adapted to have a pressurized gas therein; and a nozzle connected to said supply line, said nozzle being fixed adjacent said flapper arm so that said movement of said flapper arm affects the passage of said pressurized gas through said nozzle and thereby changes the gas pressure of the pressurized gas in said supply line.

10. A transducer in accordance with claim 9, further comprising a relay for amplifying the gas pressure in said supply line.

11. A transducer in accordance with claim 9, further including an adjustment mechanism for adjusting a rest position of the flapper arm to achieve a desired spacing of said flapper arm with respect tot he nozzle.

12. A transducer in accordance with claim 9, further including a supply of laminar flow air coupled to said supply line.

13. A transducer in accordance with claim 12, wherein said supply of laminar flow air comprises a restrictor and a regulator for controlling a pressure drop across the restrictor to a predetermined range of air pressures.

14. A transducer in accordance with claim 13, wherein said supply of laminar flow air maintains a laminar flow of air through said nozzle.

15. A transducer in accordance with claim 9, wherein said nozzle has an orifice for outputting a gas stream in response to gas pressure at the input to said nozzle, said nozzle having an annular frontal face tapered rearwardly from said orifice, and wherein said flapper arm has a flat surface adjacent said nozzle such that said nozzle directs said gas stream towards said flat surface for providing an at least substantially linear conversion of pressure of the gas stream to force on said flapper arm.

16. A transducer in accordance with claim 15, wherein said frontal face of said nozzle is tapered with an angle of about 45°.

17. A transducer in accordance with claim 16, wherein said flat surface of the flapper arm is a raised circular surface.

18. A transducer in accordance with claim 15, wherein said flat surface comprises a hardened material formed in a plastic flapper arm.

19. A transducer in accordance with claim 15, further comprising air supply means for maintaining a laminar flow of air through said nozzle.

20. A transducer in accordance with claim 19, wherein said air supply means provides an air pressure in the range of about 6 to about 15 psi to said nozzle.

21. A transducer in accordance with claim 5, further including an arm attached to said magnet for providing a mechanical output from said transducer in response to an electrical input to said coil winding.

22. A transducer in accordance with claim 5, wherein said housing divider is effective to isolate electrical current carrying components in one of said compartments to provide an explosion-proof enclosure.

23. A transducer in accordance with claim 22, wherein sidewalls of said well are formed of a non-magnetic material.

24. A transducer in accordance with claim 23, wherein said well is formed of a electrically conductive material to provide eddy current dampening of movements of said magnet.

25. A transducer in accordance with claim 5, further including biasing means for biasing the magnet to a rest position.

26. A transducer in accordance with claim 25, wherein said biasing means comprises means for producing a magnetic bias.

27. A transducer comprising:

a coil winding for generating a magnetic field responsive to an electrical input to said coil winding;

a magnet for producing a pivotal movement in response to the thus generated magnetic field;

at least one bearing attached to said magnet for allowing pivotal movement of the magnet about an axis, extending through said magnet, in response to said magnetic field;

a bearing support structure to which said at least one bearing is attached for suspending said magnet and said at least one bearing within the space encompasses by said coil winding; and biasing means for producing a magnetic bias for biasing the magnet to a rest position, wherein said biasing means comprises a permanent magnet.

28. A transducer comprising:

a coil winding for generating a magnetic field responsive to an electrical input to said coil winding;

a magnet for producing a pivotal movement in response to the thus generated magnetic field;

at least one bearing attached to said magnet for allowing pivotal movement of the magnet about an axis, extending through said magnet, in response to said magnetic field;

a bearing support structure to which said at least one bearing is attached for suspending said magnet and said at least one bearing within the space encompassed by said coil winding; and an adjustment screw formed of a magnetic material adjustably disposed in a position influenced by a magnetic field of the magnet.

29. A transducer comprising:

a coil winding for generating a magnetic field responsive to an electrical input to said coil winding;

a magnet, mounted for pivotal movement about an axis, for producing a pivotal movement in response to the thus generated magnetic field;

a flapper arm mounted with respect to said magnet to produce a movement of said flapper arm corresponding to the thus produced pivotal movement of said magnet;

a supply line adapted to have a pressurized gas therein;

a nozzle connected to said supply line, said nozzle being fixed adjacent said flapper arm so that said movement of said flapper arm affects the passage of said pressurized gas through said nozzle and thereby changes the gas pressure of the pressurized gas in said supply line; and means for balancing said magnet and said flapper arm about said axis so that said transducer is substantially insensitive to the orientation thereof.

30. A transducer in accordance with claim 29, wherein said means for balancing comprises a counterweight attached to one of said flapper arm and said magnet to provide balance about said axis.

31. A transducer in accordance with claim 30, wherein said counterweight comprises a non-magnetic material.

32. A transducer in accordance with claim 29, wherein said flapper arm is elongate and extends outwardly in one direction from said axis, and said magnet has attached thereto a counterbalance weight that extends outwardly in a different direction from said axis.

33. A transducer in accordance with claim 32, wherein said counterbalance weight is the same shape as said magnet.

34. A transducer, comprising:

a housing for containing components of the transducer, said housing having a divider therein for defining two compartments isolated from each other, said divider having a well formed therein, said well having sidewalls and a bottom;

a coil winding for generating a magnetic field responsive to an electrical input to said coil winding;

a magnet for producing a pivotal movement in response to the thus generated magnetic field;

a bearing for said magnet, said bearing being mounted with respect to said magnet for pivotally supporting said magnet about an axis;

said coil winding being disposed about said well in one of said compartments, said magnet and said bearing being disposed in the other of said compartments;

a support fixed at one end with another and extending into said well, said another end being connected to said bearing for suspending said bearing and said magnet in said well;

a flapper arm mounted with respect to said magnet to produce a movement of said flapper arm corresponding to the thus produced pivotal movement of said magnet;

a supply line adapted to have a pressurized gas therein; and a nozzle connected to said supply line, said nozzle being fixed adjacent said flapper arm so that said movement of said flapper arm affects the passage of said pressurized gas through said nozzle and thereby changes the gas pressure of the pressurized gas in said supply line.

35. A transducer in accordance with claim 34, further including a biasing structure attached to said housing for biasing said magnet to a rest position.

36. A transducer in accordance with claim 25, wherein said biasing structure comprises a permanent magnet fixed to said housing in proximity to said magnet for producing a pivotal movement.

37. A transducer in accordance with claim 35, wherein said biasing structure comprises an adjustable screw in a sidewall of said well, said screw responsive to a magnetic field to the magnet.

38. A transducer in accordance with claim 37, wherein said screw is threaded in the bottom of said well.

39. A transducer in accordance with claim 36, wherein said well is formed of a conductive, non-magnetic material to provide eddy current dampening of movements of said magnet.

40. A transducer in accordance with claim 34, wherein said flapper arm and said magnet are counterbalanced about said axis.

41. A transducer in accordance with claim 34, wherein said well is formed of a conductive, non-magnetic material to provide eddy current dampening of movements of said magnet.

42. A transducer in accordance with claim 34, further including a metallic magnetic return path for said magnet exterior of said coil winding.

43. A transducer in accordance with claim 42, wherein said magnetic return path comprises a cylindrical shield circumferentially surrounding both said magnet and said coil winding.

44. A transducer in accordance with claim 42, wherein said magnetic return path comprises a bracket to which said coil winding is mounted.

45. A transducer, comprising:

a coil winding for generating a magnetic field responsive to an electrical input to said coil winding;

a magnet for producing a pivotal movement in response to the thus generated magnetic field;

a flapper arm mounted with respect to said magnet to produce a movement of said flapper arm corresponding to the thus produced pivotal movement of said magnet;

a magnetic responsive material adjustably positioned with respect to said magnet for magnetically biasing said magnet and said flapper arm to a rest position in the absence of the magnetic field of the winding;

a supply line adapted to have a pressurized gas therein; and a nozzle connected to said supply line, said nozzle being fixed adjacent said flapper arm so that said movement of said flapper arm affects the passage of said pressurized gas through said nozzle and thereby changes the gas pressure of the pressurized gas in said supply line.

46. A transducer in accordance with claim 45, wherein said magnetic responsive material comprises at least one screw adjustably positioned with respect to the magnet to adjust a magnetic field influence therebetween.

47. A transducer in accordance with claim 45, wherein said magnetic responsive material comprises a permanent magnet.

48. A transducer, comprising:

a housing having a divider defining two housing compartments, a well formed in said divider, said well having sidewalls and a bottom;

a coil winding for generating a magnetic field responsive to an electrical input to said coil winding, said coil winding being positioned around the outer surface of the sidewalls of said well;

a magnet for producing a pivotal movement in response to the thus generated magnetic field;

a flapper arm mounted, in a flapper arm structure having a saddle for holding said magnet, to produce a movement of said flapper arm corresponding to the thus produced pivotal movement of said magnet;

a supply line adapted to have a pressurized gas therein; a nozzle connected to said supply line, said nozzle being fixed adjacent said flapper arm so that said movement of said flapper arm affects the passage of said pressurized gas through said nozzle and thereby changes the gas pressure of the pressurized gas in said supply line;

said nozzle being mounted in a nozzle structure which is fixed to said housing, said nozzle structure having a pair of depending arms, with each of said depending arms having a flexure strip bearing; and said flapper arm structure being connected to said nozzle structure through said flexure strip bearings so that said magnet is suspended for pivotal movement in said well.

49. A transducer in accordance with claim 48, wherein said nozzle structure and said flapper arm are formed of a plastic material.

50. A transducer in accordance with claim 48, wherein said magnet is suspended in said well for pivotal movement about an axis which extends through said flexure strip bearings.

51. A transducer in accordance with claim 48, further including at least one adjustable set screw positioned in the bottom of said well for adjusting a rest position of the magnet.

52. A transducer in accordance with claim 48, wherein said well is constructed of a non-magnetic and electrically conductive material.

53. A transducer in accordance with claim 48, wherein said well is generally diamond shaped to accommodate said magnet and said depending arms suspended therein.

54. A transducer, comprising:

a coil winding for generating a magnetic field responsive to an electrical input to said coil winding;

a magnet for producing a pivotal movement in response to the thus generated magnetic field;

at least one bearing for said magnet;

a housing for containing components of the transducer, said housing having a divider therein for defining two compartments isolated from each other, said divider having a well formed therein, said well having sidewalls and a bottom, said sidewalls being formed of a non-magnetic, electrically conductive material to provide eddy current dampening of movements of said magnet;

said coil winding being disposed about the outer surface of the sidewalls of said well in one of said compartments, said magnet and said at least one bearing for said magnet being disposed in the other of said compartments, a magnetic return path for said magnet being positioned exterior of said coil winding;

a flapper arm mounted with respect to said magnet to produce a movement of said flapper arm corresponding to the thus produced pivotal movement of said magnet;

a supply line adapted to have a pressurized gas therein;

a nozzle connected to said supply line, said nozzle being fixed adjacent said flapper arm so that said movement of said flapper affects the passage of said pressurized gas through said nozzle and thereby changes the gas pressure of the pressurized gas in said supply line;

said nozzle being mounted in a nozzle structure which is fixed to said housing;

each said bearing being mounted with respect to said magnet for pivotally supporting said magnet about an axis extending through said magnet;

a bearing support structure fixed at one end to said nozzle structure with another end extending into said well, said another end being connected to said at least one bearing for suspending said at least one bearing and said magnet in said well;

said flapper arm being elongate and extending outwardly in one direction from said axis;

means for balancing said magnet and said flapper arm about said axis so that said transducer is substantially insensitive to the orientation thereof;

magnetic responsive material adjustably positioned with respect to said magnet for biasing said magnet and said flapper arm to a rest position; and said nozzle having an orifice for outputting a gas stream in response to gas pressure at the input to said nozzle, said nozzle having an annular frontal face tapered rearwardly from said orifice, said flapper arm having a raised flat surface adjacent said nozzle such that said nozzle directs said gas stream towards said raised flat surface for providing an at least substantially linear conversion of pressure of the gas stream to force on said flapper arm.

* * * * *

UNITED STATES PATENT AND TRADEMARK OFFICE

CERTIFICATE OF CORRECTION

PATENT NO. : 5,257,639

DATED : November 2, 1993

INVENTOR(S) : Robert C. Prescott et al

It is certified that error appears in the above-indentified patent and that said Letters Patent is hereby corrected as shown below:

Column 23, line 28, change "tot he" to --to the--.

Column 25, line 36, change "and" to --end--.

Column 25, line 56, change "claim 25" to --claim 35--.

Column 25, line 62, after "screw", insert --being--.

Column 25, line 63, change "to" to --of--.

Column 25, line 67, change "claim 36" to --claim 38--.

Column 28, line 13, after "flapper", insert --arm--.

Signed and Sealed this

Nineteenth Day of April, 1994

Attest:

BRUCE LEHMAN

*Attesting Officer* *Commissioner of Patents and Trademarks*